US012687975B2

(12) United States Patent
Reed et al.

(10) Patent No.: US 12,687,975 B2
(45) Date of Patent: *\*Jul. 21, 2026*

(54) FAST RESTART OF LARGE MEMORY SYSTEMS

(71) Applicant: Hewlett Packard Enterprise Development LP, Spring, TX (US)

(72) Inventors: David P. Reed, Needham, MA (US); Isaac R. Nassi, Los Gatos, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 213 days.

This patent is subject to a terminal disclaimer.

(21) Appl. No.: 18/407,981

(22) Filed: Jan. 9, 2024

(65) Prior Publication Data

US 2024/0152286 A1 May 9, 2024

Related U.S. Application Data

(63) Continuation of application No. 17/953,164, filed on Sep. 26, 2022, now abandoned, which is a continuation of application No. 17/690,940, filed on Mar. 9, 2022, now Pat. No. 11,487,451.

(60) Provisional application No. 63/161,037, filed on Mar. 15, 2021.

(51) Int. Cl.
*G06F 3/06* (2006.01)

(52) U.S. Cl.
CPC .......... *G06F 3/0632* (2013.01); *G06F 3/0604* (2013.01); *G06F 3/067* (2013.01)

(58) Field of Classification Search
None
See application file for complete search history.

(56) References Cited

U.S. PATENT DOCUMENTS

| | | | |
|---|---|---|---|
| 7,886,126 B2 | 2/2011 | Bennett et al. | |
| 2009/0013149 A1 | 1/2009 | Uhlig et al. | |
| 2014/0006734 A1* | 1/2014 | Li | G06F 9/45558 |
| | | | 711/E12.103 |
| 2016/0012071 A1* | 1/2016 | Herman | G06F 16/128 |
| | | | 707/649 |
| 2020/0241906 A1 | 7/2020 | Tsirkin et al. | |
| 2022/0188291 A1* | 6/2022 | Singh | G06F 3/067 |

* cited by examiner

*Primary Examiner* — Arpan P. Savla
*Assistant Examiner* — Edmund H Kwong
(74) *Attorney, Agent, or Firm* — Hewlett Packard Enterprise Patent Department

(57) ABSTRACT

Utilizing a storage replica data structure includes receiving, at a hyper-kernel running on a computing node in a plurality of interconnected computing nodes, an indication of an operation pertaining to at least one of a guest physical memory address or a stable storage address. A guest operating system is run on a virtual environment that is defined by a set of hyper-kernels running on the plurality of interconnected computing nodes. It further includes updating a storage replica data structure. The storage replica data structure comprises a set of entries. The set of entries in the storage replica data structure comprises associations among guest physical memory addresses, physical memory addresses, and stable storage addresses.

20 Claims, 17 Drawing Sheets

| Storage Replica Table | | |
|---|---|---|
| Stable Storage Addresses (1602) | Physical Memory Addresses (1604) | Guest Physical Memory Addresses (1606) |
| [14, 0x3274] | [3, 0x123456] | 0x235678 |
| [12, 0x1456] | [2, 0x987654] | 0x675432 |
| [2, 0x9876] | [6, 0x438921] | 0x345987 |
| ... | ... | ... |
| ... | ... | ... |
| ... | ... | ... |
| ... | ... | ... |
| ... | ... | ... |
| ... | ... | ... |
| ... | ... | ... |
| ... | ... | ... |
| ... | ... | ... |

1608

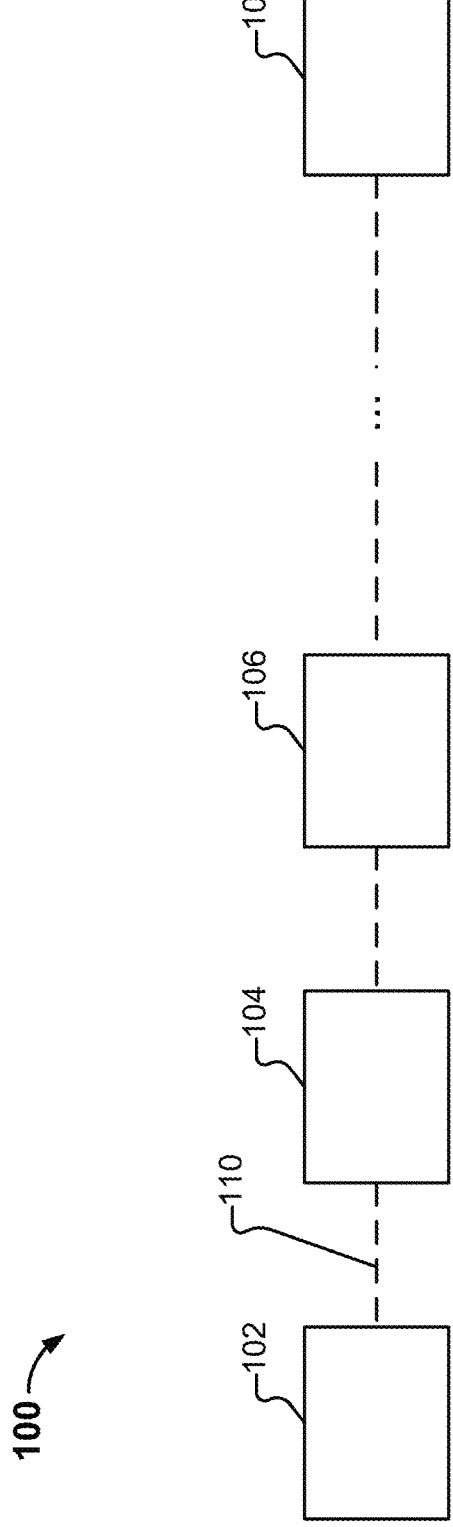
FIG. 1

800 —

Receive indication that a core, associated with a virtual processor, cannot access a needed portion of physical memory. ⌐802

Selectively move contents of the needed memory closer to the core, or remap the virtual processor to another core. ⌐804

900 ─↘

Receive an indication that a hyperthread should be assigned. ─902

Search a hierarchy for a process to assign to the hyperthread. ─904

1400

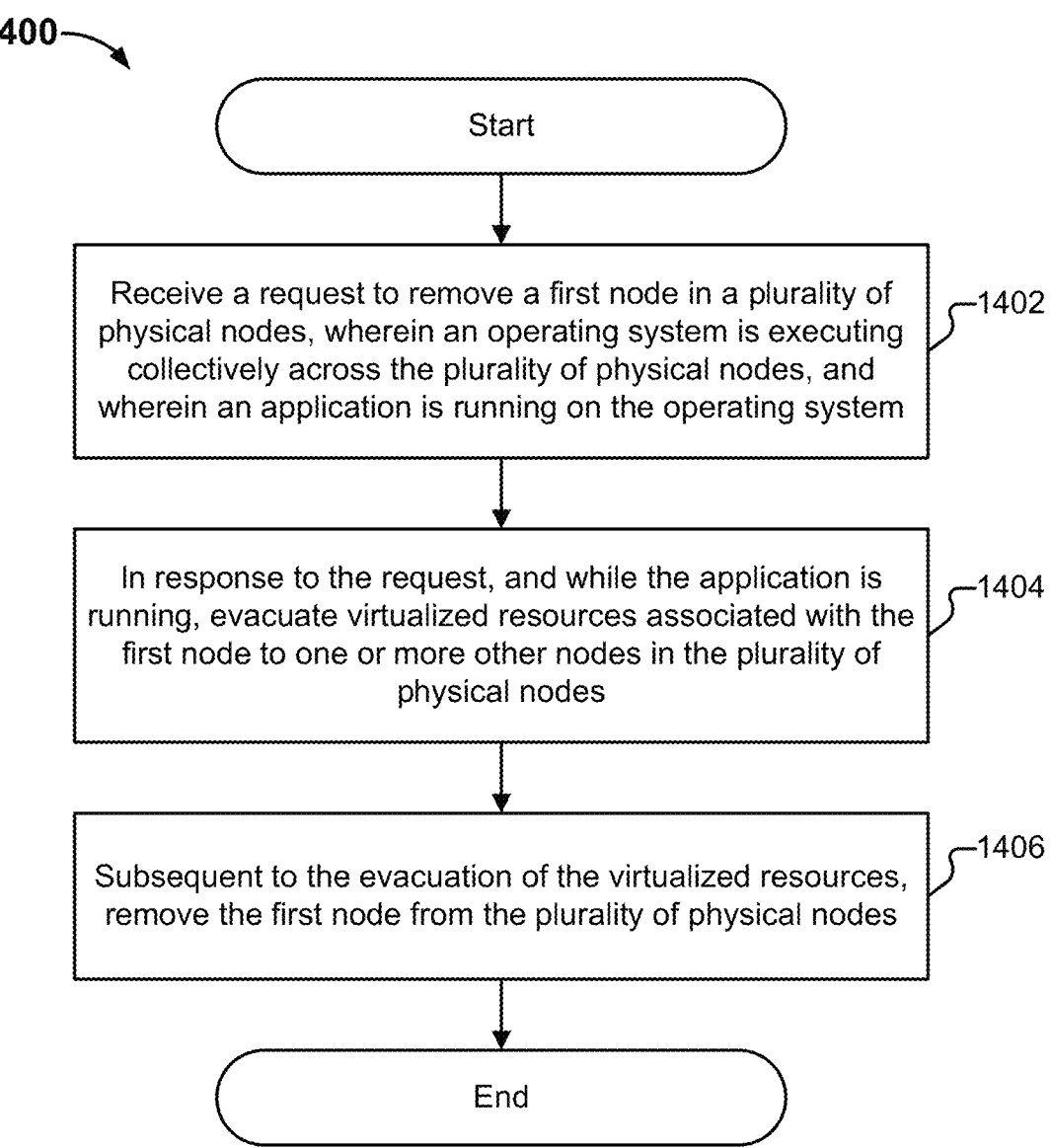

Start

Receive a request to remove a first node in a plurality of physical nodes, wherein an operating system is executing collectively across the plurality of physical nodes, and wherein an application is running on the operating system ⌐1402

In response to the request, and while the application is running, evacuate virtualized resources associated with the first node to one or more other nodes in the plurality of physical nodes ⌐1404

Subsequent to the evacuation of the virtualized resources, remove the first node from the plurality of physical nodes ⌐1406

End

FIG. 14

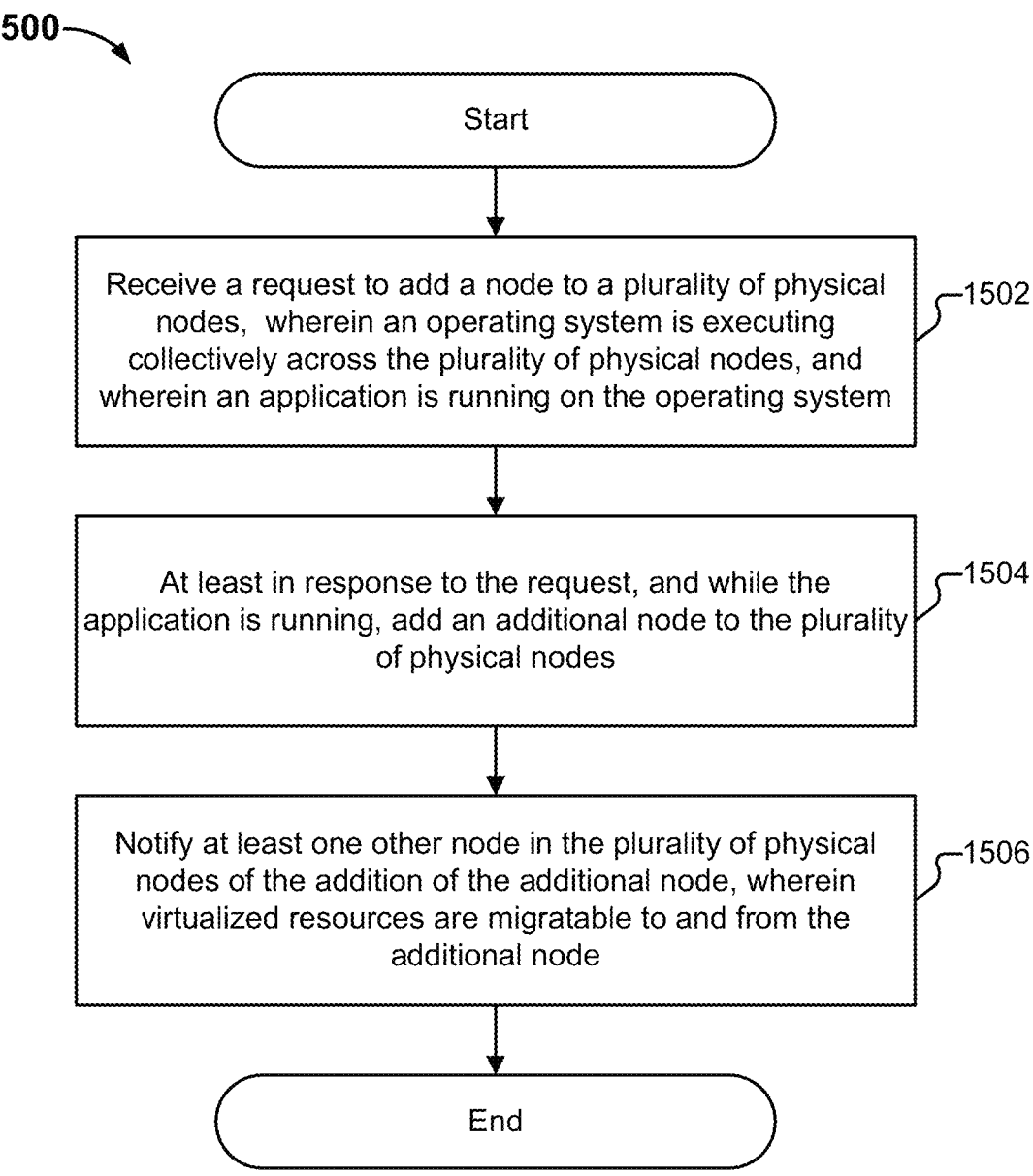

1500

Start

Receive a request to add a node to a plurality of physical nodes, wherein an operating system is executing collectively across the plurality of physical nodes, and wherein an application is running on the operating system
~1502

At least in response to the request, and while the application is running, add an additional node to the plurality of physical nodes
~1504

Notify at least one other node in the plurality of physical nodes of the addition of the additional node, wherein virtualized resources are migratable to and from the additional node
~1506

End

FIG. 15

Storage Replica Table

| Stable Storage Addresses (1602) | Physical Memory Addresses (1604) | Guest Physical Memory Addresses (1606) |
|---|---|---|
| [14, 0x3274] | [3, 0x1234456] | 0x235678 |
| [12, 0x1456] | [2, 0x9876654] | 0x675432 |
| [2, 0x9876] | [6, 0x4389921] | 0x345987 |
| ⋮ | ⋮ | ⋮ |
| ⋮ | ⋮ | ⋮ |
| ⋮ | ⋮ | ⋮ |
| ⋮ | ⋮ | ⋮ |
| ⋮ | ⋮ | ⋮ |
| ⋮ | ⋮ | ⋮ |
| ⋮ | ⋮ | ⋮ |
| ⋮ | ⋮ | ⋮ |
| ⋮ | ⋮ | ⋮ |

FAST RESTART OF LARGE MEMORY SYSTEMS

CROSS REFERENCE TO OTHER APPLICATIONS

This application is a continuation of U.S. patent application Ser. No. 17/953,164 entitled "FAST RESTART OF LARGE MEMORY SYSTEMS" filed Sep. 26, 2022, which is a continuation of U.S. patent application Ser. No. 17/690, 940, entitled FAST RESTART OF LARGE MEMORY SYSTEMS filed Mar. 9, 2022, now U.S. Pat. No. 11,487,451 issued Nov. 1, 2022 which is incorporated herein by reference for all purposes, which claims priority to U.S. Provisional Patent Application No. 63/161,037 entitled FAST RESTART OF LARGE MEMORY SYSTEMS filed Mar. 15, 2021 which is incorporated herein by reference for all purposes.

BACKGROUND OF THE INVENTION

Today, there is a very strong appetite for increasing amounts of main memory being driven by trends such as "big data," increasing use of sensors, IOTs (Internet of Things), and large amounts of data being collected through the use of mobile devices. As processing power is increasing, for example, by increasing the density of processing cores on each processor on a motherboard, the amount of memory that can be placed on the motherboard is not keeping up. It would be beneficial to have large memory systems to address such needs.

BRIEF DESCRIPTION OF THE DRAWINGS

Various embodiments of the invention are disclosed in the following detailed description and the accompanying drawings.

FIG. 1 illustrates an embodiment of a computer system.

FIG. 14 is a flow diagram illustrating an embodiment of a process of removing a node from a multi-server distributed computing architecture.

FIG. 15 is a flow diagram illustrating an embodiment of a process for adding a node to a multi-server distributed computing architecture.

FIG. 16 illustrates an embodiment of a storage replica data structure.

DETAILED DESCRIPTION

Figure 2:
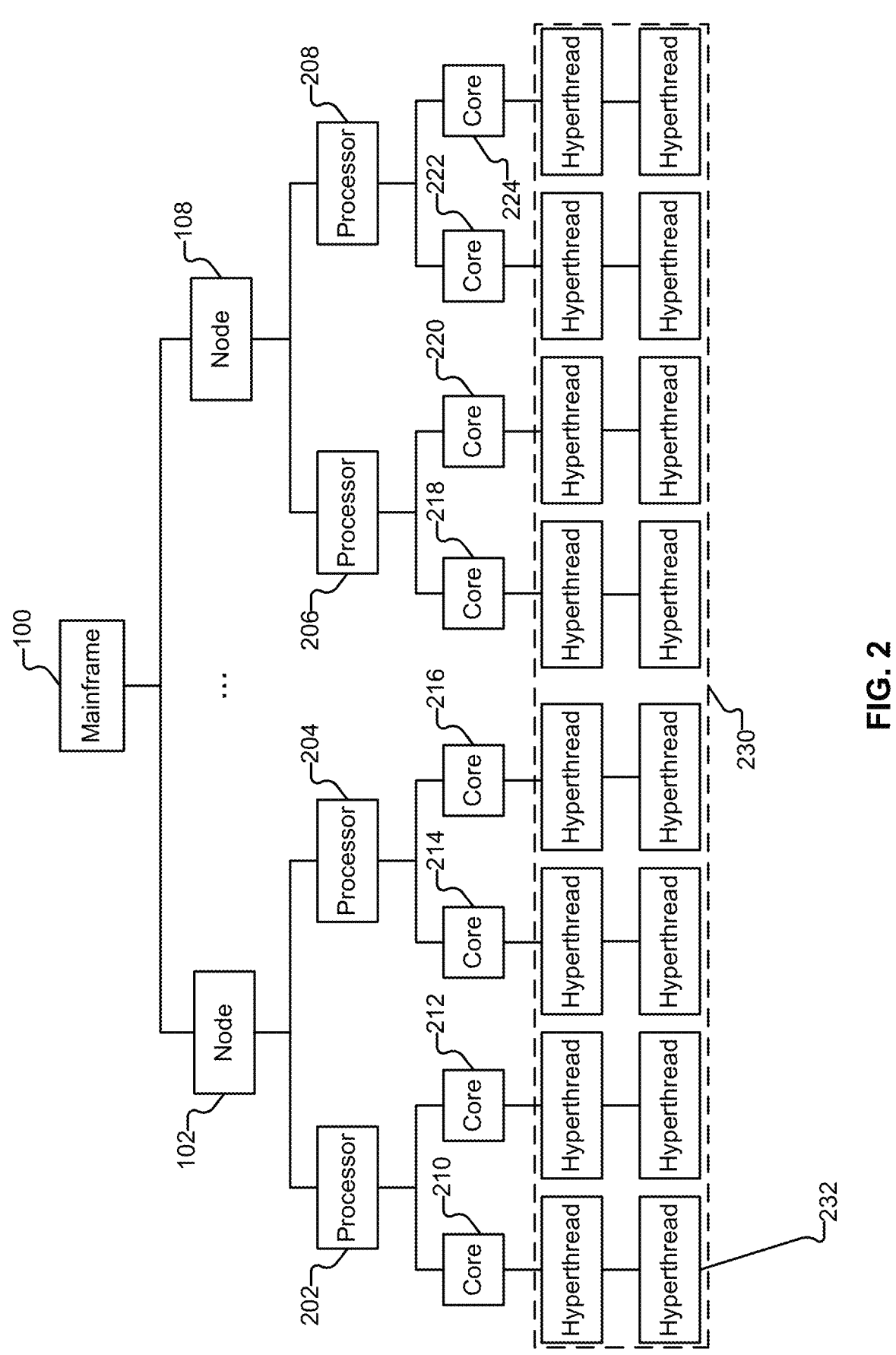
FIG. 2 illustrates the physical structure of the computer system as a hierarchy.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Described herein are techniques for fast restart of large memory systems. For example, the techniques described herein may be used to quickly restart large memory systems such as software-defined servers, further details of which will be described below. While embodiments of techniques for fast restart of software-defined servers are described herein for illustrative purposes, the techniques described herein may be variously adapted to accommodate fast restart of other types of computing systems.

Software-Defined Server Overview

As used herein, a software-defined server refers to an assembly or collection or cluster of hardware modules (e.g., computing nodes or individual computers) that run a distributed virtual machine manager referred to herein as a "hyper-kernel."

Compared to existing distributed multi-server architectures, on which a single physical node or server supports many virtual machines, in a software-defined server, a single virtual machine that spans many physical nodes/servers is supported.

Details regarding an example implementation of a software-defined server are described below.

FIG. 1 illustrates an embodiment of a computer system. System 100 is also referred to herein as a "software-defined server," an "enterprise supercomputer," and a "mainframe." In the example shown, system 100 includes a plurality of nodes (e.g., nodes 102-108) located in close proximity (e.g., located within the same rack or nearby racks of servers). In other embodiments, multiple racks of nodes (e.g., located within the same facility) can be used in the system. Further, the techniques described herein can also be used in conjunction with distributed systems.

The nodes are interconnected with an interconnect (110) such as 10-gigabit or 40-gigabit Ethernet, direct PCI-to-PCI, and/or InfiniBand. Each node comprises commodity server-class hardware components (e.g., a blade in a rack with its attached or contained peripherals). The interconnect may be dedicated, but need not be. The interconnect may also be high-speed, but need not be. In the example shown in FIG. 1, each node includes multiple physical processor chips. Each physical processor chip (also referred to as a "socket") includes multiple cores, and each core has multiple hyper-threads.

As illustrated in FIG. 2, the physical structure of system 100 forms a hierarchy (230) (from the bottom) of hyper-threads (232), cores (210-224), physical processor chips (202-208), and nodes (102-108 (with nodes 104, 106, etc. omitted from the figure and represented as ellipses)). The tree depicted in FIG. 2 is of a fixed size, defined by the hardware configuration.

As will be described in more detail below, each enterprise supercomputer (e.g., system 100) runs a single instance of an operating system. Both the operating system, and any applications, can be standard commercially available software and can run on system 100. In the examples described herein, the operating system is Linux, however other operating systems can also be used, such as Microsoft Windows, Mac OS X, or FreeBSD.

Figure 3A:
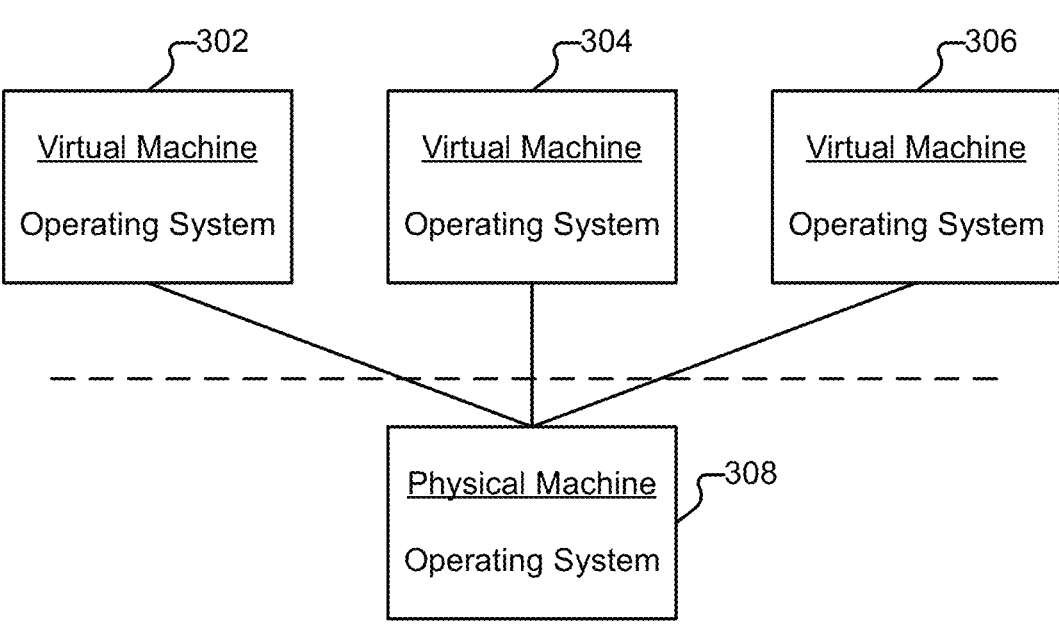
FIG. 3A depicts a virtualized computing environment in which multiple virtual machines (with respective multiple guest operating systems) run on a single physical machine.
Figure 3B:
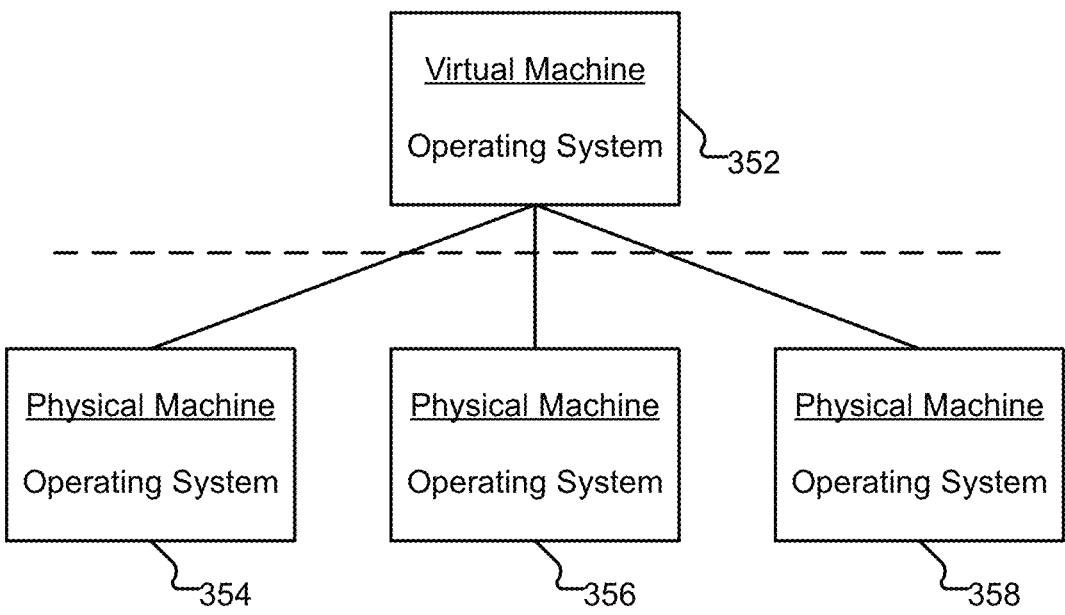
FIG. 3B depicts a virtualized computing environment in which multiple physical machines collectively run a single virtual operating system.

In a traditional virtualized computing environment, multiple virtual machines may run on a single physical machine. This scenario is depicted in FIG. 3A. In particular, three virtual machines (302-306) are running three guest operating systems on a single physical machine (308), which has its own host operating system. In contrast, using the techniques described herein, multiple physical machines (354-358) collectively run a single virtual operating system (352), as depicted in FIG. 3B.

Figure 4A:
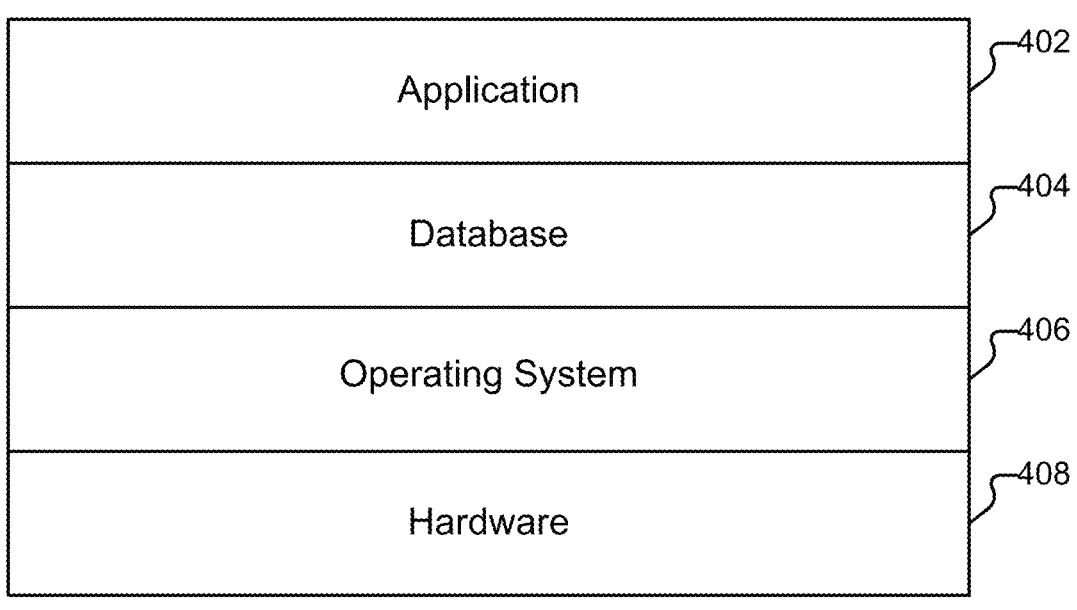
FIG. 4A depicts an example of a software stack.
Figure 4B:
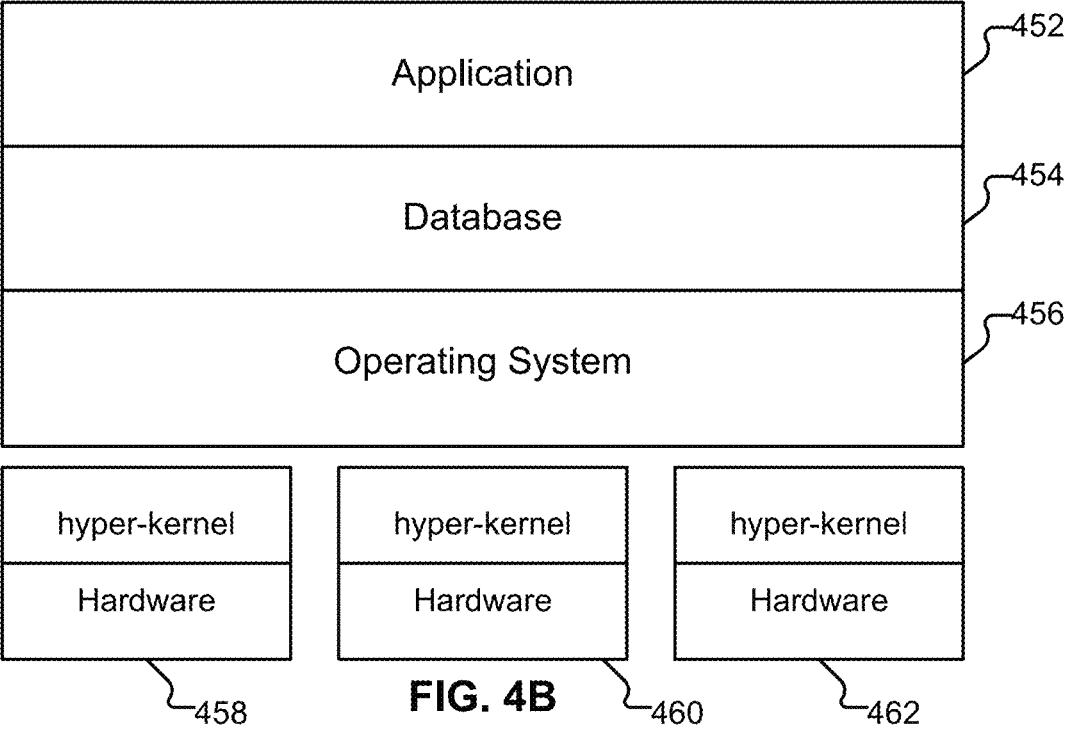
FIG. 4B depicts an example of a software stack.

One example of a software stack is depicted in FIG. 4A. Such a stack may typically be used in traditional computing environments. In the stack shown in FIG. 4A, an application (402) sits above a database engine (404), which in turn sits upon an operating system (406), underneath which lies hardware (408). FIG. 4B depicts a software stack used in some embodiments. As with the stack shown in FIG. 4A, an application (452) sits above a database engine (454), which in turn sits upon an operating system (456). However, underneath the operating system and above the hardware is a layer of software (referred to herein as a hyper-kernel) that observes the system running in real time and optimizes the system resources to match the needs of the system as it operates. The hyper-kernel (one example of a virtual machine manager) conceptually unifies the RAM, processors, and I/O (Input Output resources for example Storage, Networking resources) of a set of commodity servers, and presents that unified set to the operating system. Because of this abstraction, the operating system will have the view of a single large computer, containing an aggregated set of processors, memory, and I/O. As will be described in more detail below, the hyper-kernel optimizes use of resources. The hyper-kernel can also help optimize other I/O system resources such as networks and storage. In some embodiments, based on observations and profiles of running software, performance indicators (hints) are provided to upper layers (e.g., database management systems) about the dynamic performance of the system that can further improve overall system performance.

The hyper-kernel can be ported to all major microprocessors, memory, interconnect, persistent storage, and networking architectures. Further, as hardware technology evolves (e.g., with new processors, new memory technology, new interconnects, and so forth), the hyper-kernel can be modified as needed to take advantage of industry evolution.

As shown in FIG. 4B, operating system 456 is running collectively across a series of nodes (458-462), each of which has a hyper-kernel running on server hardware. Specifically, the operating system is running on a virtual environment that is defined by the collection of hyper-kernels. As will be described in more detail below, the view for operating system 456 is that it is running on a single hardware platform that includes all of the hardware resources of the individual nodes 458-462. Thus, if each of the nodes includes 1 TB of RAM, the operating system will have as a view that it is running on a hardware platform that includes 3 TB of RAM. Other resources, such as processing power, and I/O resources can similarly be collectively made available to the operating system's view.

Figure 5:
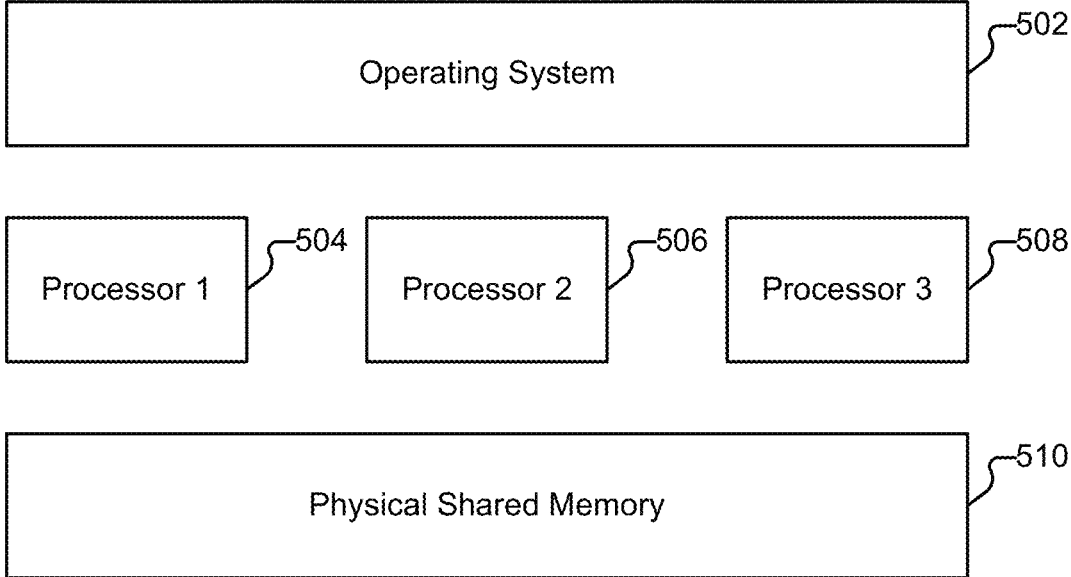
FIG. 5 depicts an example of an operating system's view of hardware on an example system.

FIG. 5 depicts an example of an operating system's view of hardware on an example system. Specifically, operating system (502) runs on top of processors 504-508 and physical shared memory 510. As explained above, an operating system can run on either a traditional computing system or on an enterprise supercomputer such as is shown in FIG. 1. In either case, the view of the operating system will be that it has access to processors 504-508 and physical shared memory 510.

Figure 6A:
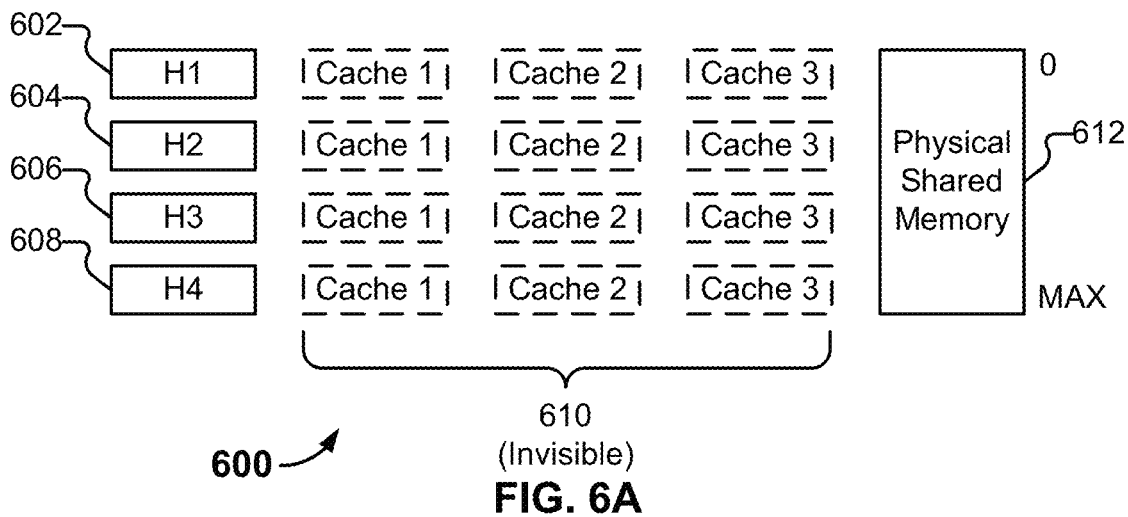
FIG. 6A depicts an example of a hyperthread's view of hardware on a single node.

FIG. 6A depicts an example of a hyperthread's view of hardware on a single node. In this example, a node has four hyperthreads denoted H1 (602) through H4 (608). Each hyperthread can access all portions of physical shared memory 612. Physical shared memory 612 is linear, labeled location 0 through a maximum amount, "max." The node also includes three levels of cache (610).

Figure 6B:
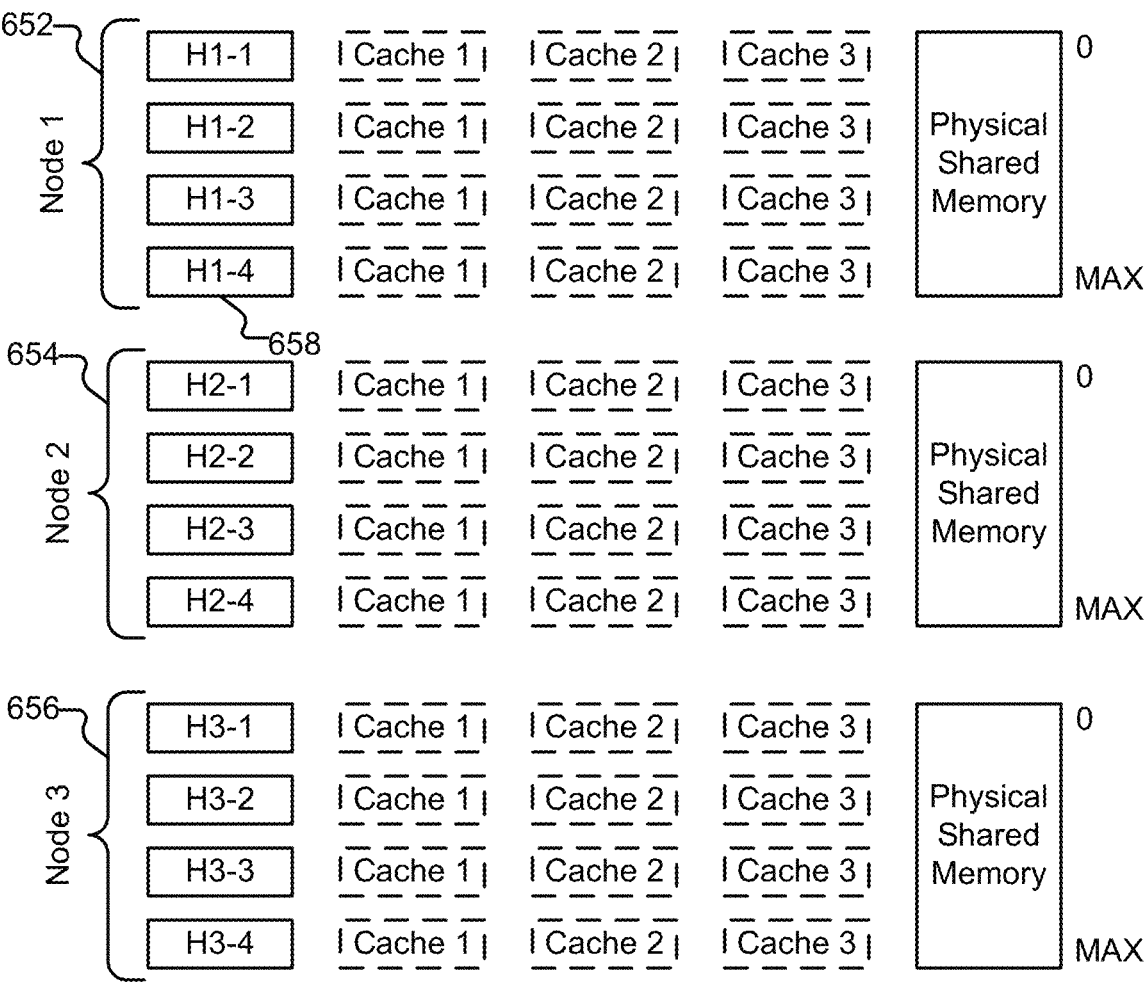
FIG. 6B depicts an example of a hyper-kernel's view of hardware on an example system.

FIG. 6B depicts an example of a hyper-kernel's view of hardware on an example system. In this example, three nodes (652-656) are included in an enterprise supercomputer. Each of the three nodes has four hyperthreads, a physical shared memory, and cache (i.e., each node is an embodiment of node 600 shown in FIG. 6A). A hyperthread on a given node (e.g., node 652) has a view that is the same as that shown in FIG. 6A. However, the hyper-kernel is aware of all of the resources on all of the nodes (i.e., the hyper-kernel sees twelve hyperthreads, and all of the physical shared memory). In the example shown in FIG. 6B, a given hyperthread (e.g., hyperthread 658, "H1-4") is labeled with its node number (e.g., "1") followed by a hyperthread number (e.g., "4").

Figure 7:
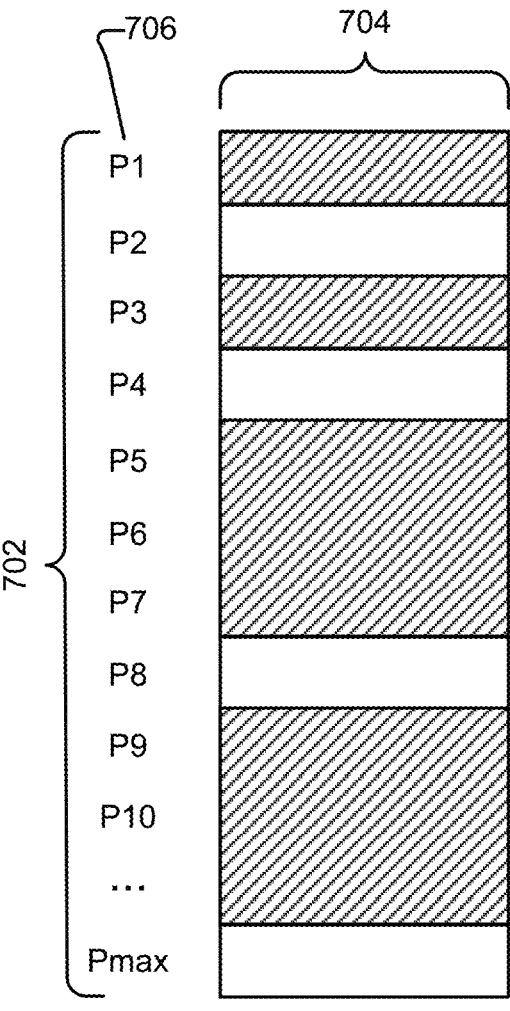
FIG. 7 depicts an example of an operating system's view of hardware on an example of an enterprise supercomputer system.

FIG. 7 depicts an example of an operating system's view of hardware on an example of an enterprise supercomputer system. The operating system sees a plurality of "virtualized processors" (also referred to herein as "virtual processors" and "VCPUs") denoted in FIG. 7 as P1 through Pmax (702).

The virtualized processors correspond to the total number of hyperthreads across all nodes included in the enterprise supercomputer. Thus, using the example of FIG. 6B, if a total of twelve hyperthreads are present across three nodes, a total of twelve virtualized processors would be visible to an operating system running on the enterprise supercomputer. The operating system also sees "virtualized physical memory" (704) that appears to be a large, physical, linear memory of a size equal to the total amount of physical memory across all nodes.

As will be described in more detail below, the hyper-kernel dynamically optimizes the use of cache memory and virtual processor placement based on its observations of the system as it is running. A "virtual processor" is a computing engine known to its guest operating system, i.e., one that has some operating system context or state. As will be described in more detail below, the hyper-kernel dynamically optimizes the use of cache memory and virtual processor placement based on its observations of the system as it is running. A "virtual processor" is a computing engine known to its guest operating system, i.e., one that has some operating system context or state.

Resource Virtualization

Memory Virtualization

As explained above, in the physical configuration, each node has an array of memory addresses representing locations in memory. As such, in a physical configuration with three nodes (e.g., as depicted in FIG. 6B), there are three memory locations each of which has address 0x123456. In contrast, in the virtual configuration, all memory addresses are unique and represent the sum total of all memory contained in those three nodes. In the virtual configuration, all memory is shared, and all memory caches are coherent. In some embodiments, memory is further subdivided into a series of contiguous blocks, with monotonically increasing memory addresses. In the examples described herein, each page has 4K bytes of memory, however, other subdivisions can also be used, as applicable. The term "blocks" is used herein to describe contiguous arrays of memory locations. In some embodiments, the "blocks" are "pages."

Processor Virtualization

A virtual processor (e.g., virtual processor 706 of FIG. 7), as seen by the operating system, is implemented on a hyperthread in the physical configuration, but can be location independent. Thus, while the operating system thinks it has 500 processors running on a single physical server, in actuality it might have 5 nodes of 100 processors each. (Or, as is shown in FIG. 6B, the operating system will think it has twelve processors running on a single physical server.) The computation running on a virtual processor is described either by the physical configuration on a hyperthread when the computation is running, or in a "continuation," when the virtual processor is not running (i.e., the state of an interrupted or stalled computation).

As used herein, a "continuation" represents the state of a virtual processor. Each continuation:

Has processor state (i.e., saved registers, etc.).

Has a set of performance indicators that guide a scheduler object with information about how to intelligently assign continuations to leaf nodes (e.g., hyperthreads) for execution.

Has a virtual-processor identifier that indicates the processor the operating system thinks is the physical processor to which this continuation is assigned.

Has an event on which this continuation is waiting (possibly empty).

Has a state which includes: "waiting-for-event" or "ready."

I/O Virtualization

I/O systems observe a similar paradigm to processors and memory. Devices have a physical address in the physical configuration and virtual addresses in the virtual configuration. When migrating computations (described in more detail below), if for example, there are memory buffers associated with I/O operations, the I/O devices used will likely perform better if they are co-located with the memory with which they are associated, and can be moved accordingly.

Resource Maps

Resource maps are used to translate between virtual and physical configurations. The following are three types of resource maps used by enterprise supercomputers in various embodiments.

A "physical resource map" is a table that describes the physical resources that are available on each node. It contains, for example, the number and type of the processors on each node, the devices, the memory available and its range of physical addresses, etc. In some embodiments, this table is read-only and is fixed at boot time.

An "initial virtual resource map" is fixed prior to the booting of the operating system and describes the virtual resources that are available from the point of view of the operating system. The configuration is readable by the operating system. In some cases, it may be desirable to configure a system (from the viewpoint of the operating system) that does not match, one-to-one, with the underlying hardware resources. As one example, it may be desirable for the operating system to have more memory and fewer cores. This can be accomplished by changing the ratio of memory to cores, i.e., by modifying the initial virtual resource map.

A "current resource map" is created and maintained by each hyper-kernel instance. This map describes the current mapping between the virtual resource map and the physical resource map from the point of view of each node. For each entry in the virtual resource map, a definition of the physical resources currently assigned to the virtual resources is maintained. Initially (e.g., at boot time), the current resource map is a copy of the initial virtual resource map. The hyper-kernel modifies the current resource map over time as it observes the characteristics of the resource load and dynamically changes the mapping of physical resources to virtual resources (and vice-versa). For example, the definition of the location of the Ethernet controller eth27 in the virtualized machine may at different times refer to different hardware controllers. The current resource map is used by the hyper-kernel to dynamically modify the virtual hardware resource mappings, such as the virtual memory subsystem, as required.

Resource Migration Overview

Using the techniques described herein, virtualized resources, such as virtual general-purpose processors, virtual memory, virtual networks, and virtual disks can be migrated between physical locations. Virtual interrupts may also be remotely delivered. As explained above, the operating system is provided with information about the virtualized system, but that information need not agree with the physical system. As long as the basic hardware abstractions expected by the operating system are not violated, a virtual machine may look to the operating system just like a physical machine.

As described above, in the example software-defined server described herein, there is an identical instance of the hyper-kernel running on each node of the cluster that the virtual machine spans.

Due to physical hardware boundaries, a physical processor cannot directly address every guest physical address. When a guest physical address needs to be read or written, it is translated into a physical address that the physical processor can access.

In one embodiment, this is handled through the physical processor's second level page tables. When software makes a reference to a guest (virtual) physical address, if the page of memory containing that address is resident on the node that has the processor that generated that address, the address is represented in the second level page table. Automatic address translation hardware will then translate that address to a guest physical address and then to a real physical address as it normally does by using the first and second level page tables, with no performance degradation. However, if the memory address is not present in the second level page table, the hardware cannot completely translate that guest address to a real physical address, and the processor generates an interrupt. The hyper-kernel fields that interrupt and analyzes the request (similar to what an operating system might do when it needs to copy a page that is not memory-resident but is only resident on a backing store). This analysis may result in a request for that page to be sent (migrated) to the node from a different node, or it may result in a decision to migrate that virtual processor to the node that has that page of memory. Page reads and writes may be handled differently. For example, readable pages may be replicated, but a writable page requires additional overhead to remove that page from the L4 cache of other nodes that may have a copy (i.e., invalidation).

In one embodiment, to migrate a virtual processor, the hyper-kernel takes a snapshot of the state of the processor (e.g., a continuation, using 6400 bytes of data, or any other amount as appropriate) and sends it in a message over the dedicated interconnect (e.g., Ethernet) to the chosen destination, where the suspended virtual processor may be restored onto another physical processor (e.g., implemented as a hyperthread of a processor core) at the destination node. Saving and restoring processor state may be implemented using mechanisms provided for processors supporting virtualization. Since the program counter has not advanced, the instruction is then restarted. Since the page and the virtual processor are now co-resident, the virtual processor continues running. It is possible that in some cases the instruction generates additional interrupts to access different non-resident pages, but the mechanism that is used may be the same. When the virtual processor migrates, its updated location is recorded (e.g., in the resource maps described above). However, for reliability, perfect location knowledge is not assumed, as the virtual processor may have subsequently re-migrated.

In the following example of resource migration, suppose an enterprise supercomputer holds a large in-memory database, larger than can fit into a single node. Part of the database is in a first node, "node1." Suppose one of the cores on a different node, "node2," is trying to access data that is owned by node1 and that does not reside locally in a cache on node2. The core on node2 will receive a memory access violation because it is trying to access data that it believes it should be able to access (but cannot). As will be described in more detail below, the exception is handled in the hyper-kernel.

One way that the situation can be resolved is by moving the needed area of memory to node2, and then returning control back to the operating system (which, in turn, returns it back to the database system). The software can then proceed as intended (i.e., as if the access violation never occurred).

In many cases, there may be one or more other cores in other nodes (e.g., "node3") that are also trying to access the same area block of memory as needed by node2 above. Node3 might be attempting to access the same data, or it might be accessing different data contained in the memory that was moved (also referred to as "false sharing"). The data could be moved to node3, but if the core on node2 asks for the data a second time, the data would need to be moved back to node2 (i.e., potentially moving the data back and forth repeatedly), which can be slow and wasteful. One way to avoid moving data back and forth between cores is to recognize that both cores and the associated block of data should be co-located. Using the techniques described herein, the memory and the computation can be migrated so that they reside on the same node. Doing so will result in a higher likelihood of faster access to data, and a higher probability of sharing data stored in local caches.

When the access violation occurs, an event is triggered (in a system dependent way) to which the hyper-kernel responds. One example of how such an event can be handled is by the invocation of a panic routine. Other approaches can also be used, as applicable. As will be described in more detail below, the hyper-kernel examines the cause of the event and determines an appropriate strategy (e.g., low level transaction) for handling the event. As explained above, one way to handle the event is for one or more blocks of hyper-kernel virtualized memory to be transferred from one node's memory to another node's memory. The transfer would then be initiated, and the corresponding resource maps would be updated. A continuation would be built poised to be placed in a local table in shared memory, referred to herein as an "event table," so that the next thing the continuation does when it is resumed would be to return control to the operating system after the transfer is completed. Alternatively, a decision could be made to move the virtual processor to the node that contains the memory being requested or to move the virtualized memory (and its virtualized memory address) from one node to another. Different decisions for how to handle the stall may be based on the characteristics or context or cause of the stalling event. In various embodiments, the hyper-kernel makes three decisions when handling an event: which (virtual) resources should move, when to move them, and to where (in terms of physical locations) they should move.

TidaTree

The physical hierarchical structure depicted in FIG. 2 has an analogous software hierarchy comprising a set of "scheduler objects" (i.e., data structures), each of which has a set of characteristics described below. The scheduler objects form a "TidalTree," which is an in-memory tree data structure in which each node of the tree is a scheduler object. Each scheduler object corresponds to an element of the physical structure of the supercomputer (but not necessarily vice versa), so there is one node for the entire machine (e.g., node 100 as shown in FIG. 2), one node for each physical node of the system (e.g., node 102 as shown in FIG. 2), one node for each multicore socket on the physical nodes that comprise the entire machine (e.g., node 202 as shown in FIG. 2), one node for each core of each socket (e.g., node 210 as shown in FIG. 2), and one node for each hyperthread on that core (e.g., node 232 as shown in FIG. 2).

Each scheduler object s:

Is associated with a physical component (e.g., rack, blade, socket, core, hyperthread).

Except for the root of the tree, has a parent scheduler object which is partly responsible for directing its operations (as explained in more detail below).

Has a set of children each of which is a scheduler object. This is the null set for a leaf (e.g., hyperthread) node. As explained in more detail below, it is the responsibility of a scheduler object s to manage and assign (or re-assign) work to its children, and indirectly to its grandchildren, etc. (i.e., s manages all nodes in the subtree rooted at s).

Has a work queue, which is a set of continuations (as described earlier).

Has a (possibly empty) set of I/O devices that it also has the responsibility to manage and assign (or re-assign) work.

Each node can potentially be associated with a layer of some form of cache memory. Cache hierarchy follows the hierarchy of the tree in the sense that the higher the scheduler object is, the slower it will usually be for computations to efficiently utilize caches at the corresponding level of hierarchy. The cache of a scheduler object corresponding to a physical node can be a cache of memory corresponding to that node. The memory on the physical node can be thought of as a cache of the memory of the virtual machine.

Resource Migration—Additional Information

The hyper-kernel simulates part of the virtual hardware on which the virtual configuration resides. It is an event-driven architecture, fielding not only translated physical hardware events, but soft events, such as receipt of inter-node hyper-kernel messages generated by hyper-kernel code running on other nodes.

As explained above, when an interrupt event significant to the hyper-kernel occurs, the hyper-kernel makes a decision of how to respond to the interrupt. Before control is returned to the operating system, any higher priority interrupts are recognized and appropriate actions are taken. Also as explained above, the hyper-kernel can make three separate decisions: (1) which resources to migrate upon certain events, (2) when to migrate them, and (3) to where those resources should move.

In the following example, suppose a scheduler object "s" in a virtual machine is in steady state. Each scheduler object corresponding to a physical node has a set of physical processor sockets assigned to it. Hyperthreads in these sockets may or may not be busy. The physical node also has some fixed amount of main memory and a set of I/O devices, including some network devices. Scheduler object s, when corresponding to a node, is also responsible for managing the networks and other I/O devices assigned to nodes in the subtree rooted at s. The following is a description of how resources can migrate upon either synchronous or asynchronous events.

Migrations Triggered by Synchronous Events

In the following example, suppose there exists a leaf node scheduler object s, and virtual processor p assigned to s. Leaf node schedule object s is assumed to be executing an application or operating system code on behalf of an application. Assuming the leaf node is not in an infinite loop, p will eventually run out of work to do (i.e., stall) for some reason (e.g., waiting for completion of an I/O operation, page fault, etc.). Instead of allowing p to actually stall, the hyper-kernel decides whether to move the information about the stalled computation to some other node, making one of that other node's processors "responsible" for the stalled continuation, or to keep the "responsibility" of the stalled computation on the node and instead move the relevant resources to the current node.

The stall is thus handled in either of two ways: either the computation is moved to the physical node that currently has the resource, or else the resource is moved to the physical node that has requested the resource. Example pseudo code for the handling of a stall is provided below (as the "OnStall" routine) in the "EXAMPLE ROUTINES" section below. Decisions such as how to handle a stall can be dependent on many things, such as the order of arrival of events, the state of the computation running on the virtual machine, the state of the caches, the load on the system or node, and many other things. Decisions are made dynamically, i.e., based on the best information available at any given point in time.

Recording Stalled Computations

Stalled computations are recorded in a data structure referred to as a "continuation." A continuation has a status that can be, for example, "waiting-for-event" or "ready." A stalled computation gets recorded as a newly created continuation with status "waiting-for-event." Once the reason for stalling is satisfied (e.g., due to detection of the event), the status of the corresponding continuation is changed to "ready." Each continuation with status "ready" is stored in a "wait queue" of a scheduler object so that eventually it gets scheduled for execution. In contrast, any continuation with status "waiting-for-event" will not be stored in any scheduler object's wait queue. Instead, it is stored in the local shared memory of the physical node where the hardware event that stalled the corresponding computation is expected to occur, such as receipt of a missing resource.

Additionally, the newly created continuation is associated with the stalling event that caused its creation. This mapping between (stalling) events and continuations awaiting these events permits fast dispatch of asynchronous events (see the "handleEvent" described below). The mapping between continuations and events is stored in a table called "event table" and is kept in the shared memory of the corresponding physical node. Each physical node has its own event table, and an event table of a physical node is directly addressable by every core on that physical node. All anticipated events recorded in an event table of a physical node correspond to hardware events that can occur on that physical node. The scheduler object s mapped to a physical node n represents n, and the event table of n is associated with s. In some cases, several continuations may be waiting on the same event, and so some disambiguation may be required when the event is triggered.

Continuations are built using the "InitContinuation" routine. If a decision is made to move the computation, the remote physical node holding the resource will build a continuation that corresponds to the stalled computation and will store it in the remote physical node's event table. When that continuation resumes, the resource will be available. In effect, the hyper-kernel has transferred the virtual processor to a different node.

In the case where a decision is made to move the resource, the node that has experienced the stall requests the transfer of the resource and builds a continuation using InitContinuation and stores it in the local event table. Upon receipt of the resource, the continuation is attached to an appropriate node in the TidalTree, and when that continuation is resumed, the resource will generally be available and visible. In effect, the virtual resource has been transferred to the node that requested it.

Note that by placing continuations in event tables, it is guaranteed that the processor that receives the event will quickly find the related continuations in its local event table. The reason for the stall in the computation will have been satisfied.

Having dealt with the stall, the virtual-processor p will in effect be suspended. In between processing the stall and finding a new continuation to resume, p becomes an "anonymous shadow processor," i.e., a processor with no identity known to the operating system. This shadow processor then looks for a new continuation to resume. An example of this is shown below in the "assignProcessor" routine described in more detail below.

Notation

Let e be the event that stalled virtual processor p. Assume that e is triggered by local hardware of some physical node n. In particular, assume r is the resource, which caused the stalling event to occur. Resource r could be a block of memory, or an I/O operation, or a network operation. Assume that p is assigned to scheduler object s, which belongs to the subtree rooted at the scheduler object that represents physical node n.

On-Stall

The following are example details regarding an "on-stall" routine. The migration-continuation function returns true if and only if processor p in node n decides that the resource should not move, i.e., the computation should move. This can be determined by a number of factors such as history and frequency of movement of r between nodes, the type of r, the cost of movement, the number of events in n's local event table waiting for r, system load, etc. For example, it may not be desirable to move a resource if there is a continuation stored in n's local event table that is waiting for it.

A variety of patterns of events that would benefit from migrations exist. One approach to describing these patterns of events, like access violations, is in formal language theory. Regular (i.e., Chomsky type-3) languages can be recognized by finite state automata. In addition, using a compact and flexible notation, a description of the events that are observed can be made as sentences (or Chomsky sequences) in the regular language, and the recognition modeled as state transitions in the corresponding finite state automaton. When the full Chomsky sequence of events is seen, migration-continuation gets evaluated accordingly: if the finite state automaton accepts the Chomsky sequence, the condition is met, otherwise, it is not met. The length of the minimized finite state machine defines the amount of history that needs to be kept.

In various embodiments, all events happen locally, and the hyper-kernel on the physical node receiving the event must handle it—truly synchronous events are not assumed to occur between physical nodes. To coordinate migration strategy between nodes, "messages" are used. Message "sends" are synchronous from a node's point of view, but message "receives" are asynchronous, in that a processor or shadow processor, in general, does not wait for receipt of a message. When messages arrive, they are dealt with by the hyper-kernel as a virtual interrupt. In one embodiment, the hyper-kernel will not allow a processor to resume a continuation while there are messages waiting to be handled. Therefore, before control is transferred back to the operating system, the queue is checked, and any messages are dealt with prior to the transfer of control back to the operating system.

For scheduler object s and continuation c, a cost function cost(s,c) can be used to guide the search up the tree. If multiple ancestors of p have non-empty queues, then p may not want to stop its search at the first ancestor found with a nonempty wait queue. Depending on the metrics used in the optimizing strategy, p's choice may not only depend on the distance between p and its chosen ancestor but on other parameters such as length of the wait queues.

A function, find-best-within(s), can be used to return the "best-fit" continuation in a (non-empty) wait queue of a scheduler object. Examples of parameters that can be considered include:

1. Position in the queue
2. The relationship between p and the last location recorded in the continuation (the closer those locations are the better it may be for reusing cache entries).
3. Performance indicators recorded in the continuations in the queue.

The cost and find-best-within functions can be customized as applicable within a given system.

Migrations Triggered by Asynchronous Events

Examples of asynchronous events include: receipt of a packet, completion of an I/O transfer, receipt of a resource, receipt of a message requesting a resource, etc. Generally, a hyper-kernel that receives an event corresponding to a hardware device managed by the operating system needs to deliver a continuation associated with that event to a scheduler object s. By doing so, s will make this continuation available to an appropriate scheduler object and then ultimately to the computation managed by the operating system represented by that continuation. If, on the other hand, the event is the receipt of a message from a hyper-kernel on another physical node, the hyper-kernel can handle it directly.

To simplify explanation, in the examples described herein, an assumption is made that there is only one continuation associated with an event. The procedures described herein can be generalized for the case where multiple continuations are associated with the same event, as needed.

In some embodiments, the search for a scheduler object on which to place the continuation starts at the leaf of the tree that built the continuation and then proceeds upward (if the computation previously executed on this node). By doing so, the likelihood of reusing cache entries is increased.

Handle-Event

Pseudo code for an example handle-event routine is provided below in the "EXAMPLE ROUTINES" section. The cost function, cost(s,c), is a function that helps determine the suitability of assigning c to scheduling object s. The cost function can depend on a variety of parameters such as the size of the wait queues, the node traversal distance between s and the original scheduling node for c (to increase the probability that cache entries will be reused), and the history of the virtual processor, the physical-processor, and the continuation. If the wait queues of the scheduler objects close to s already contain too many continuations, then it may take a relatively longer time until any newly added continuation is scheduled for execution. Example conditions contributing to cost(s,c) are described below, and the conditions can be customized as applicable.

Costs

Cost functions are used to evaluate options when selecting continuations and scheduling objects. Cost functions can be expressed as the summation of a sum of weighted factors:

$$\text{cost} = w_1 f_1^{x_1} + w_2 f_2^{x_2} + \ldots + w_n f_n^{x_n},$$

where $w_i$ indicates the importance of the corresponding factor and $x_i$ indicates an exponential.

Examples of factors $f_i$ are listed for each of the costs below. Weights $w_i$ and exponents $x_i$ can be determined in a variety of ways, such as empirically and by simulation. Initial weights and exponents can be tuned to various application needs, and can be adjusted by an administrator to increase performance. The weights can be adjusted while the system is active, and changing weights does not change the semantics of the hyper-kernel, only the operational performance characteristics.

Examples of the factors that can be considered include:

Length of time since the last processor evacuated this scheduler object.

Height of the scheduler object in the TidalTree.

Length of the work queue.

Reservation status (i.e., it may be the case that some application has reserved this resource for a specific reason).

Node specification (i.e., the node itself might have been taken out of service, or is problematic, has in some way a specialized function, etc.).

Age of the continuation in the queue.

Last physical processor to run this continuation.

Last virtual processor to run this continuation.

Node on which this continuation was last executing.

The "temperature" of the cache. (A cache is "warm" when it has entries that are likely to be reused. A cache is "cold" when it is unlikely to have reusable cache entries.)

Group membership of the continuation (i.e., the continuation may be part of a computation group, each element of which has some affinity for other members of the group).

Performance Indicators (Hints) and special requirements.

EXAMPLES

"OnStall" and "assignProcessor"

Figure 8:
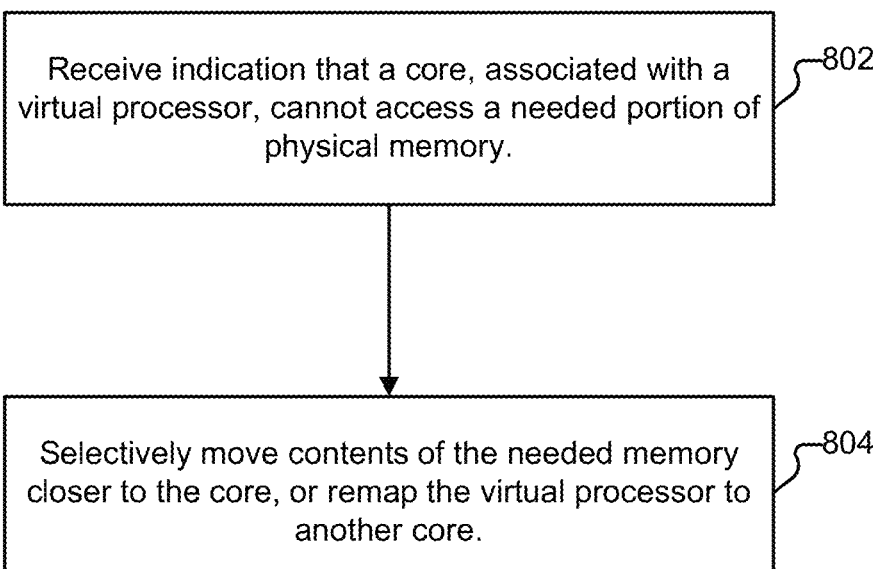
FIG. 8 illustrates an embodiment of a process for selectively migrating resources.

FIG. 8 illustrates an embodiment of a process for selectively migrating resources. In some embodiments, process 800 is performed by a hyper-kernel, such as in conjunction with the OnStall routine. The process begins at 802 when an indication is received that a core (or hyperthread included in a core, depending on whether the processor chip supports hyperthreads) is blocked. As one example, suppose a hyperthread receives a request, directly or indirectly, for a resource that the hyperthread is not able to access (e.g., RAM that is located on a different node than the node which holds the hyperthread). When the hyperthread fails to access the resource (i.e., an access violation occurs), an interrupt occurs, which is intercepted, caught, or otherwise received by the hyper-kernel at 802. In particular, the hyper-kernel receives an indication at 802 that the hyperthread is blocked (because it cannot access a resource that it has been instructed to provide). In addition to reporting its blocked state, the hyperthread provides information such as the memory address it was instructed to access and what type of access was attempted (e.g., read, write, or modify).

At 804, the hyper-kernel determines whether the needed memory should be moved (e.g., to the node on which the blocked hyperthread is located), or whether the requesting process should be remapped (i.e., the virtual processor should be transferred to a different node). The decision can be based on a variety of factors, such as where the needed memory is located, the temperature of the cache, the workload on the node holding the hyperthread, and the workload on the node holding the needed memory (e.g., overworked or underworked). In some embodiments, the workload of a node is determined based at least in part on the average queue length in the TidalTree.

If the hyper-kernel determines that the memory should be moved, the hyper-kernel uses its current resource map to determine which node is likely to hold the needed memory and sends a message to that node, requesting the resource. The hyper-kernel also creates a continuation and places it in its event table. The hyperthread that was blocked at 802 is thus freed to take on other work, and can be assigned to another virtual processor using the assignProcessor routine.

The hyper-kernel checks its message queue on a high-priority basis. When the hyper-kernel receives a message from the node it contacted (i.e., the "first contacted node"), in some embodiments, one of two responses will be received. The response might indicate that the first contacted node has the needed resource (and provide the resource). Alternatively, the message might indicate that the contacted node no longer has the resource (e.g., because the node provided the resource to a different node). In the latter situation, the first contacted node will provide the identity of the node to which it sent the resource (i.e., the "second node"), and the hyper-kernel can send a second message requesting the resource—this time to the second node. In various embodiments, if the second node reports to the hyper-kernel that it too no longer has the resource (e.g., has provided it to a third node), the hyper-kernel may opt to send the continuation to the third node, rather than continuing to request the resource. Other thresholds can be used in determining whether to send the continuation or continuing the resource (e.g., four attempts). Further, a variety of criteria can be used in determining whether to request the resource or send the continuation (e.g., in accordance with a cost function).

In the event the hyper-kernel determines that the continuation should be transferred (i.e., that the computation should be sent to another node rather than receiving the resource locally), the hyper-kernel provides the remote node (i.e., the one with the needed resource) with information that the remote node can use to build a continuation in its own physical address space. If the remote node (i.e., the one receiving the continuation) has all of the resources it needs (i.e., is in possession of the resource that caused the initial access violation), the continuation need not be placed into the remote node's event table, but can instead be placed in its TidalTree. If the remote node needs additional resources to handle the continuation, the received continuation is placed in the remote node's event table.

Figure 9:
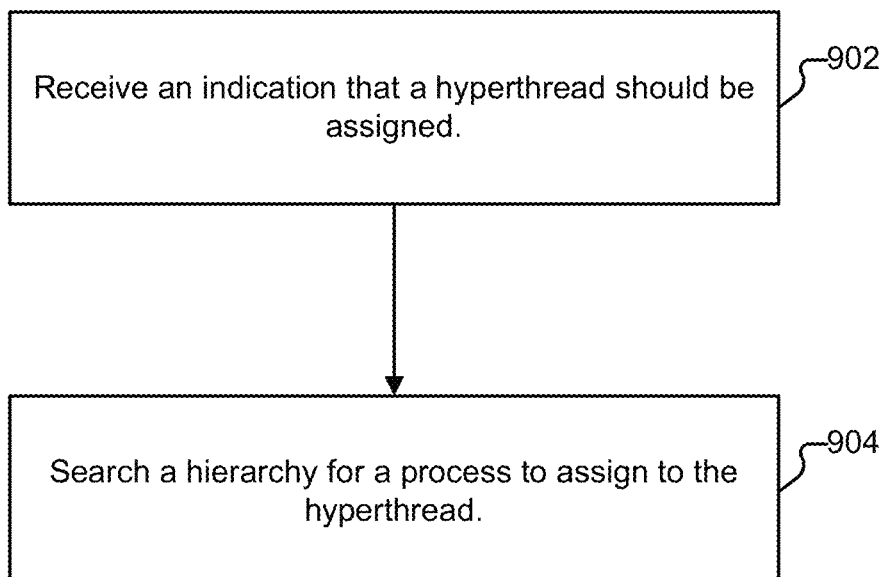
FIG. 9 illustrates an embodiment of a process for performing hierarchical dynamic scheduling.

FIG. 9 illustrates an embodiment of a process for performing hierarchical dynamic scheduling. In some embodiments, process 900 is performed by a hyper-kernel, such as in conjunction with the assignProcessor routine. The process begins at 902 when an indication is received that a hyperthread should be assigned. Process 900 can be invoked in multiple ways. As one example, process 900 can be invoked when a hyperthread is available (i.e., has no current work to do). This can occur, for example, when the hyper-kernel determines (e.g., at 804) that a continuation should be made. The previously blocked hyperthread will become available because it is no longer responsible for handling the computation on which it blocked (i.e., the hyperthread becomes an "anonymous shadow processor"). As a second example, process 900 can be invoked when a message is received (e.g., by the hyper-kernel) that a previously unavailable resource is now available. The hyper-kernel will need to locate a hyperthread to resume the computation that needed the resource. Note that the hyperthread that was originally blocked by the lack of a resource need not be the one that resumes the computation once the resource is received.

At 904, the TidalTree is searched for continuations that are ready to run, and one is selected for the hyperthread to resume. In various embodiments, the TidalTree is searched from the leaf-level, upward, and a cost function is used to determine which continuation to assign to the hyperthread. As one example, when a hyperthread becomes available, the continuation that has been queued for the longest amount of time could be assigned. If no continuations are waiting at the leaf level, or are outside a threshold specified by a cost function, a search will be performed up the TidalTree (e.g., the core level, then the socket level, and then the node level) for an appropriate continuation to assign to the hyperthread. If no appropriate continuations are found for the hyperthread to resume at the node level, the hyper-kernel for that node contacts the root. One typical reason for no continuations to be found at the node level is that there is not enough work for that node to be fully utilized. In some embodiments, the node or a subset of the node can enter an energy conserving state.

Dynamic Reconfiguration of a Software-Defined Server Overview

In some embodiments, the hyper-kernel includes a set of features referred to herein as a "dynamic adaptive reconfiguration framework," which enhances system availability in a datacenter context by allowing dynamic reconfiguration of a software-defined server without downtime due to failures or required (or desired) elasticity capacity changes to improve the efficient utilization of computing resources. That is, this additional layer of the hyper-kernel allows for dynamic adaptive reconfiguration of the software-defined server while the system is running, without having to bring the system down.

The resiliency and reconfiguration mechanisms described herein are based in part on the framework of the software-defined server architecture, which includes the aforementioned techniques for migrating and mobilization of virtualized resources (e.g., virtual CPUs, guest pages of memory, virtualized I/O, etc.) between nodes, as well as modularity.

Dynamic reconfiguration, as referred to herein, refers to the capability of changing or modifying the set of hardware components implementing or supporting a software-defined system, while the system continues to run a guest operating system and its applications. That is, in contrast to existing data center systems, in which applications and virtual machines must stop running when making changes to underlying host hardware, using the techniques described herein, reconfiguration of the physical resources of an enterprise supercomputer such as a software-defined server may be performed dynamically, without rebooting the guest operating system. From the guest operating system's point of view, no changes occur, and the guest operating system is unaware of the reconfiguration of the underlying host hardware. Thus, using the techniques described herein, resiliency is provided by providing the system and workload the ability to continue operating while minimizing downtime (resulting in high availability).

The guest operating system may have its own set of resiliency features that are independent of the hyper-kernel. These may be implemented in software, such as database log files and rollback capabilities, and in hardware, such as with redundant disks. In some embodiments, the dynamic reconfiguration mechanism described herein provides an additional set of resiliency features.

The distribution of failures among component types is typically skewed. For example, central processing units (CPUs) rarely fail, while network cables and switches fail relatively frequently (for example, CPUs fail infrequently, but over time they and the electronic circuits around them suffer cumulative damage that tends to limit their operational time to a few years, at which point they start to become unreliable). Power supplies may overheat, fans may fail, etc. In some embodiments, the dynamic reconfiguration mechanism described herein provides a framework for exploiting redundant hardware techniques that reduce the impact of failure of the components that are typically the causes of downtime. Also, normal preventative maintenance of components as they age may require the components be taken out of service, causing downtime. Using the techniques described herein, hardware failures are transformed into degradation of performance, which are then handled by dynamic reconfiguration.

For example, described in further detail below are "resilient logical modules," which, in some embodiments, are assemblies of one or more hardware components that have graceful failure modes, rather than those that cause immediate catastrophic failures. As described herein, a graceful failure involves a transition to a degraded state such that the system continues to function and no data is lost; depending on the degree of redundancy of available hardware, a later failure may be catastrophic if the failing component is not replaced.

This type of approach, in which a software-defined server is composed of resilient logical modules through dynamic reconfiguration, allows a high level of availability (e.g., "continuous availability" with an arbitrary number of "9's" of availability) to be achieved, despite hardware disruptions (e.g., due to hardware failures, physical resource scaling, etc.). The primary causes of data center downtime typically have to do with shrinking the system capacity, growing the system capacity, and component failures while running (where outage times increase as existing data center systems become larger). Using the resiliency/reconfiguration mechanisms described herein, these causes need not result in any downtime of the software-defined server. This also minimizes outage costs due to hardware (e.g., component failures, reconfiguration, repairs, etc.) by allowing for fail in place/scheduled repair, hot spares, etc., as will be described in further detail below. The outage costs due to software (e.g., software bugs, operator error, overload, etc.) are also reduced by allowing thin provisioning, which will be described in further detail below.

Example Use Cases and Applications

As described above, the dynamic reconfiguration mechanism described herein allows for various enhancements in system availability in a datacenter context, examples of which, without limitation, are by allowing dynamic reconfiguration of a software-defined server without downtime due to failures, and by allowing required or desired elasticity capacity changes to improve the efficient utilization of computing resources. Using the techniques described herein, continuing operation of the software-defined server is achieved despite hardware disruption (e.g., component failure, rescaling, etc.). Further details regarding such enhancements are described in further detail below.

Thin-Provisioning of Software-Defined Servers

The ability to facilitate required or desired capacity changes to the software-defined server (i.e., dynamic reconfigurability of the software-defined server) is referred to herein as "thin-provisioning" of software-defined servers. One advantage of the hyper-kernel described above is that it creates a layer of software in between a guest operating system and the underlying hardware. As a result, the hardware and the guest operating system and its applications are more loosely coupled than as compared to previous data centers. Thin provisioning leverages and exploits this loose coupling, allowing available virtual resources to move from hardware node to node, and be remapped onto physical resources dynamically (e.g., via the resource migration techniques described above). For example, storage volumes, memory, and central processing units may be instantiated by physical resources as needed, rather than be chosen and fixed in capacity for the duration of operation of the software-defined server. As one example, a software-defined server may be started with 1 TB (terabyte) of physical DRAM (dynamic random access memory) and 10 physical processors, and then later on have its physical instantiation be upgraded, while the system is running, to have more DRAM and more CPUs, without having to restart the guest operating system.

Because virtual memory pages, virtual CPUs, Input/Output (I/O) devices, and other virtual resources are mobile throughout the software-defined server, and are dynamically reconfigurable, the virtual machine supported/presented by the hyper-kernel, using the techniques described herein, may add and remove sufficient physical resources that support the virtual resources, and then re-map them to additional or different physical resources. This provides flexibility to scale the system's hardware capacity up and down with a workload's requirements, as needed, resulting in a more efficient utilization of computing resources.

Indirectly, this also provides a form of resiliency, not only to failures, but also to utilization economies. Using the dynamic reconfiguration mechanism described herein, expanding and shrinking workloads may be easily and automatically accommodated. For example, excess resources can be used by other software-defined servers until needed, and power requirements of the software-defined server can be adjusted proportional to the needs of the workload.

Fail-in-Place and Scheduling of Repairs

The ability to dynamically reconfigure a software-defined server without downtime due to failures allows for fail-in place and further allows, for example, the scheduling of repairs. The dynamic reconfiguration mechanism described herein thus has an additional benefit for resiliency. Physical devices may be taken out of service for repair, replacement, or upgrades, while the software-defined server and its guest operating system continue to run. Replaceable devices may be removed from the software-defined server with disrupting it. Moreover, physical devices may remain in place for an arbitrary period until a removal for replacement or upgrade can be scheduled. Such flexibility is an improvement to existing data center environments, where the techniques described herein both reduce downtime by allowing the system to continue running, while at the same time allowing the appropriate repairs to be done properly, without, for example, the need for "emergency on-call specialists."

Further details regarding handling of hardware faults while allowing the software-defined server and its guest operating system to continue to run are described below.

Modules and Components

As used herein, a "component" refers to any hardware portion of the software-defined server, such as a chip, a board, a housing, a cable, etc. In contrast, as used herein, a "module" refers to a combination or collection of one or more physical components that are combined to create or provide an abstract function of the software-defined server or hyper-kernel. One property of the software-defined server module is that the module's hardware function may be understood without understanding the details of its constructions, and that its operational state may be described efficiently.

In some embodiments, resilient commodity hardware components with fault-tolerance are used in the software-defined server (and to create modules), such as error-correcting code (ECC) memory, processor over-temperature slowdown, software redundant array of independent disks (RAID), multipath storage over fabric, bonded networks, etc.

Examples of types of modules in a software-defined server are described in further detail below. In various embodiments, modules include: a node (e.g., one or more processor chips, a motherboard, its power supply, and a number of memory DIMMs (dual in-line memory modules), etc.), the interconnect network (e.g., the switches, cables, and NICs (network interface controllers) that provide inter-node connectivity), and an addressable guest network interface (e.g., one port on a hardware NIC). Other examples of module types will be described in further detail below.

Resilient Modules

As used herein, a resilient logical module is a module that fails gracefully (e.g., degrades rather than fails). Details regarding resilient modules and how each type of module needed by the hyper-kernel may be implemented as such a resilient module are described below.

Resilient modules include devices that fail into a degraded state. While suffering reduced performance, resilient modules continue to function, such that there is no data loss. However, a failure while in a degraded state may be catastrophic. Degraded components are those that need replacement in a timely manner to maintain system resiliency. Examples of such components include commoditized ECC memory, RAID1/5 volumes, bonded NICs, redundant power supplies, etc.

In some embodiments, a resilient module in a software-defined server is an assembly of one or more hardware components that may be described as having one of five operation states:

1. Available
2. Operational
3. Degraded
4. Failing
5. Broken

An Available module is a module that is ready for use in a software-defined server, but is not actually in use.

An Operational module is a module that is connected to the software-defined server and is being used by the hyper-kernel. An Operational module is functioning correctly with full performance.

A Degraded module is a module that is connected to the software-defined server, and is being used by the hyper-kernel. Although it functions correctly, its performance may be substandard, and should be replaced in a timely manner, or it will enter the Failed operational state.

A Failed module is a module that is connected to the software-defined server and causes the hyper-kernel to fail. A Failed module does not function correctly.

A Broken module is a module that is not connected to the software-defined server. If a Broken module were connected to the software-defined server, it would cause the hyper-kernel to fail. A Broken module does not function correctly.

A software-defined server whose connected modules are each Operational or Degraded is functioning. A software-defined server with any modules that are Failing is not working.

Available and Broken modules are not connected to the software-defined server, and have no effect on system availability.

Figure 10:
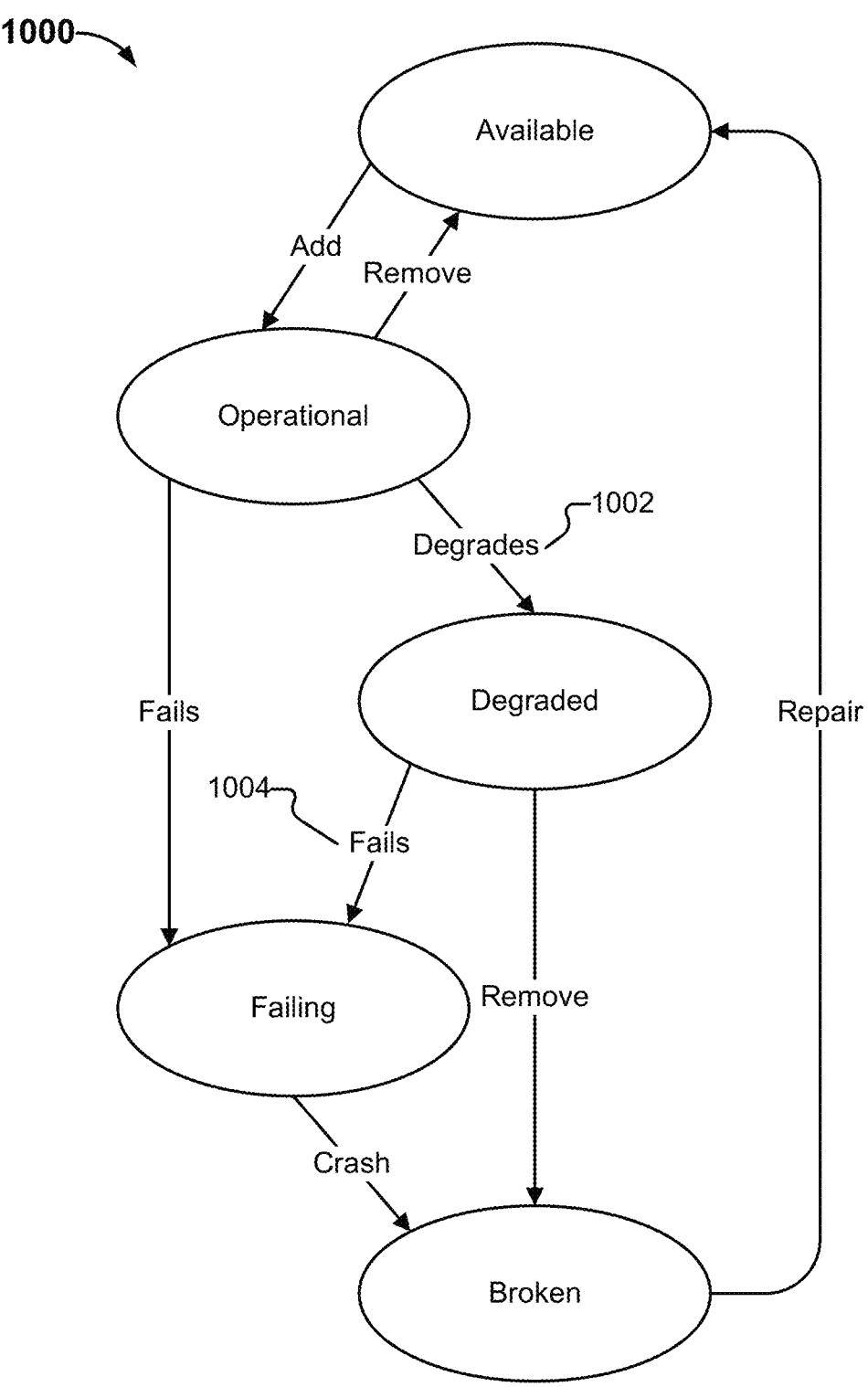
FIG. 10 illustrates an embodiment of an operation state transition diagram.

FIG. 10 illustrates an embodiment of an operation state transition diagram. Operation state transition diagram 1000 illustrates how operation states of a resilient module change during its life in a software-defined server. The transitions labeled "degrades" (1002) and "fails" (1004) represent hardware faults internal to the module. In this example, the other transitions are caused by operations external to the module. A resilient module is unlikely to take the "fails" transition between Operational and Failing. In contrast, a non-resilient module is unlikely to take the "degrades" transition between Operational and Degraded.

As described above, logical modules are designed to fail gracefully. Using resilient physical components such as error-correcting memory, CPU modules that reduce their clock speed when overheating, software RAID, redundant switches, bonded network ports, etc., as described above, the majority of failures (e.g., 99.9%) will be those that fail gracefully and degrade, and result in transitions from the operational to the degraded state. That is, the most common data center failures may be made into resilient modules (e.g., power supplies, network connections (connectors, NICs), disk drives, ECC memory, etc.). Failure of a redundant component leads to degraded module operation, but the system stays up, needing repair. Those failures that cause transitions from the degraded state to the failing state will then be to cover second failures. In contrast, only a small number of failures (e.g., 0.01% of failures) will be those that directly transition a logical module from the operational state to the failing state.

Available modules may be added to or detached from the software-defined server.

Broken modules may be detached from the software-defined server or repaired in place (e.g., reseating a network cable). Broken modules should not be added to a software-defined server.

The use of resilient modules improves system reliability by dynamic reconfiguration.

Dynamic Reconfiguration while Running

As used herein, reconfiguration refers to a process of binding and unbinding logical modules to physical components, and virtual machine components to logical modules. The distinction between logical modules and physical components is a form of virtualization (albeit, a type of virtualization different from the virtualization of processors, memory, and I/O devices to create a virtual machine that is performed by the hyper-kernel). In some embodiments, enhancing the hyper-kernel by adding the capability of dynamic reconfiguration involves creating a separation that allows for the substitution of hardware components upon which the hyper-kernel operates. For example, the hyper-kernel is divided into two layers. One layer includes logical modules (described in further detail below), which manage certain physical resources in the software-defined server. The second layer is referred to as an "upper layer" of the hyper-kernel that works with any logical modules on any node.

Figure 11:
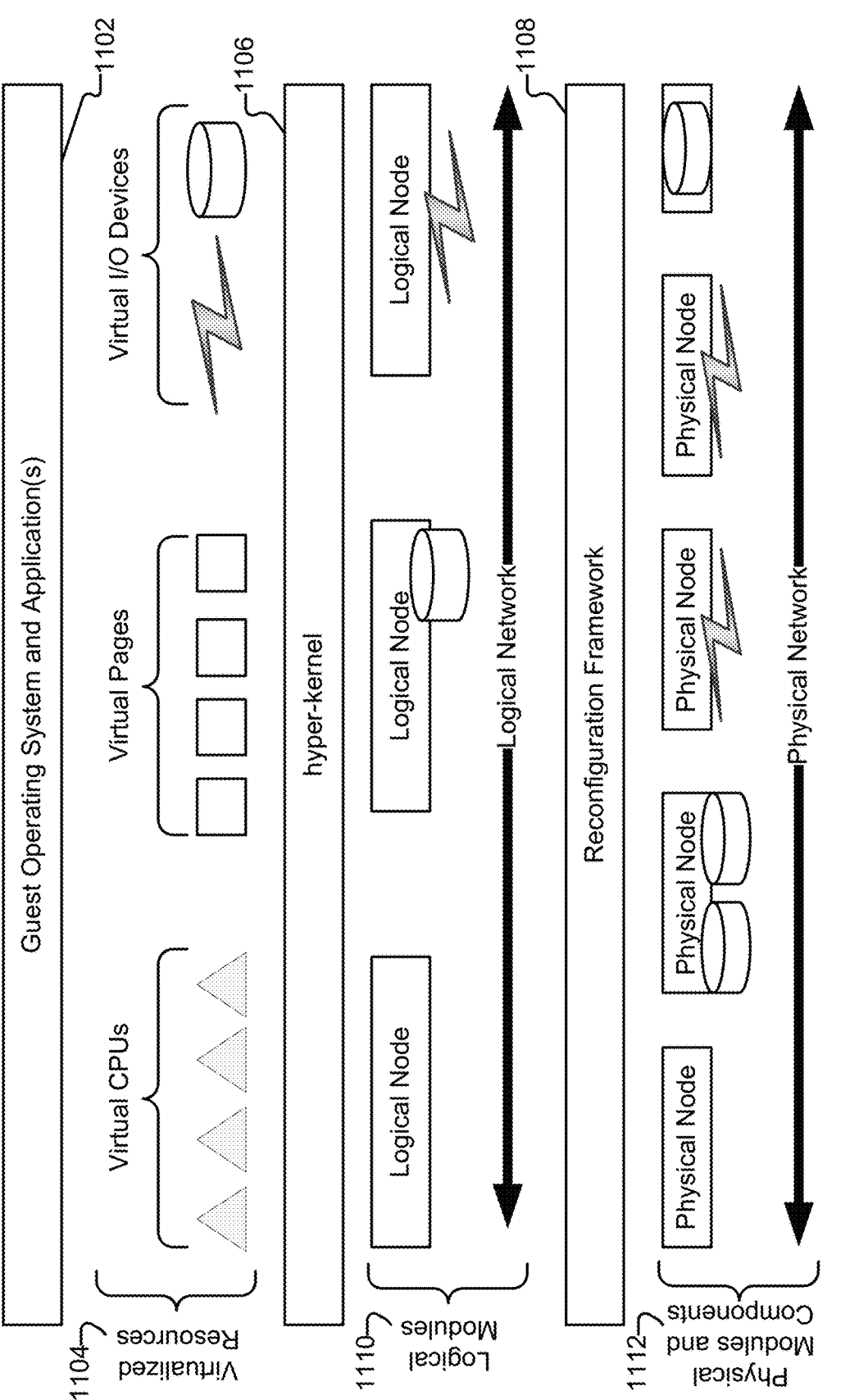
FIG. 11 illustrates an embodiment of a dynamic adaptive reconfiguration framework of a distributed hyper-kernel.

FIG. 11 illustrates an embodiment of a dynamic adaptive reconfiguration framework of the distributed hyper-kernel. As shown in this example, a guest operating system and application(s) (1102) execute on top of a set of virtualized resources (1104). The virtualized resources are presented by a distributed hyper-kernel 1106. As shown in this example, the hyper-kernel also includes a dynamic adaptive reconfiguration framework 1108, which includes a layer of logical modules 1110. As shown in this example, the hyper-kernel binds to the logical modules, rather than physical components such as physical modules and components 1112. As described above, the logical module implementation allows the freedom and flexibility for logical modules to migrate their use of physical components, such that physical components may be removed transparently.

In one embodiment, the logical modules, representing hardware components or other clumps of hardware resources/components in the hyper-kernel, are implemented as data tables. As will be described in further detail below, one example of a logical module is one that represents a physical disk drive. The corresponding data table describes, for example, where the disk drive is in the software-defined server, what transactions are outstanding to the disk drive, etc. Thus, the logical module includes the metadata about the physical components maintained by the hyper-kernel. As the logical module is not hardware, the logical module may be migrated. That is, a logical module implementation is free to migrate its use of physical components, and physical components may be moved transparently. The migration of logical modules may be performed without the knowledge of the guest operating system. That is, this layer of logical modules is hidden from the guest operating system.

Thus, in the dynamic reconfiguration framework described herein, the hyper-kernel runs on an assembly of logical modules that are bound at any particular time to physical components. In turn, the hyper-kernel provides a set of virtual resources forming a virtual machine to the guest system, also by binding and unbinding virtual resources to logical modules. The dynamic reconfiguration layer described herein includes a layer, the logical module, that cuts across the architecture of the hyper-kernel.

As shown, there is a split between logical modules and virtualized objects. The hyper-kernel includes an internal layering of resilient logical modules that degrade rather than break. This allows for the dynamic reconfiguration of a software-defined server while the guest continues to run, as well as the thin provisioning of physical resources. The dynamic reconfiguration technique described herein also provides a solution to two aspects of resilience, in that the system may continue to run despite failures of hardware components in resilient modules, and there is no downtime for scale changes or preventative maintenance.

Logical Module Dynamics

Physical components of a distributed logical module span multiple nodes. Logical modules may relocate, at any time, the function to span a different set of nodes. In some embodiments, relocation is function-specific. For example, to remove a node: network interfaces switch MAC addresses to an NIC port on another node; local drive array spanning nodes in RAIDS structure simply drop a drive on a node and add an empty driver on another The guest operating system is unaware of the relocation. The relocation process introduces no disruption in function.

Logical Module Interface

In some embodiments, the logical module interface in the dynamic reconfiguration framework described herein is defined by a set of commands that are issued by the hyper-kernel that is using the logical module. Commands may perform their job/task either immediately or asynchronously. In some embodiments, completion of each asynchronous command is signaled through a completion queue. As one example, each completion is delivered as a kernel event (also referred to herein as a "kevent") on a kernel queue (also referred to herein as a "kqueue") specified in the command parameters when the command is issued. Other types of completion queues may be implemented.

In some embodiments, each logical module in a software-defined server has a unique identifier, also referred to herein as its "logical module ID" (LMI). The scope of LMIs is global to the software-defined server, during the lifetime of the software-defined server as an entity. Nodes are logical modules, and therefore have their own LMI, which is a node identifier used in the hyper-kernel. As one example, the node identifier is used in the upper half of the hyper-kernel. In one example implementation, LMIs are represented as 12-bit unsigned integers (allowing for 4096 logical modules in a software-defined server) and may be stored wherever node identifiers are stored (for example in data structures used for resource tracking of pages). The LMIs may be as large as needed.

Logical modules may be relocated infrequently, for example, only when reconfigurations occur. Commands issued to a logical module on one node may need to be transmitted to another node. In one embodiment, updates to logical module locations maintain a strictly consistent mapping of logical module locations across all nodes (which may be in contrast to the resource tracking used for virtual resources in the hyper-kernel, where the per-node knowledge of the location of virtual resources may be imperfect).

In some embodiments, the dynamic reconfiguration framework is implemented in part by an application programming interface (API) that is used by the hyper-kernel. The API may include commands issued to Logical modules as procedure calls. In some embodiments, a dedicated interconnect is used to turn a local procedure call into a remote procedure call.

For example, the API for logical volumes includes multi-block commands such as readblox, writeblox, and flush. The API also includes Async, for distributed completion queues. The APIs may be extended for guest memory transfer for block 110, for example to inject guest page (even if current page at a guest physical address is remote) and to link to guest page (e.g., copy on guest page move).

General Configuration Changes for Modules

In some embodiments, in order to remove a physical node, both the logical node module and all logical modules it holds are removed. In one example implementation, a logical module is removed only when it is no longer Operational and is thus unused by the hyper-kernel. Another logical module takes over the functions of the removed module.

VCPU, Page, and I/O Device Evacuation

Before removing a logical node from the software-defined server, it should no longer contain any guest state. In particular, guest pages and VCPUs should not be active on the logical node. The process of removing guest pages, VCPUs, and I/O devices is referred to herein as "evacuation." In the hyper-kernel architecture described herein, evacuation includes the hyper-kernel mobilizing VCPUs, pages, and I/O, using, for example, the resource migration mechanisms described above.

One issue in evacuation is the handling of guest pages that are "wired" to a node. In some existing systems, certain guest pages may be permanently mapped, for example, to user space pages, for unbounded periods of time. As another example, certain pages may be wired into memory, where such pages would have to be moved from one memory module to another. In existing solutions, such pages had to be moved from one memory module to another. This is inadequate or problematic, for example, in situations where I/O devices retain direct addresses to particular addresses in particular memory modules, such that any I/O buffers in use prevented the removal of memory modules containing those addresses.

In contrast, in the architecture described herein, the hyper-kernel makes all virtual pages mobile among nodes (i.e., no "wired" pages), such that the virtual pages may be moved at any time. In one embodiment, the software-defined server does not map guest pages to user space, and I/O device emulations deal with pages that move by stalling on access to a non-local page, then either requesting the page be moved to the node where the emulation is running, or else moving the I/O device emulation thread to the node containing the virtual page.

Thus, the dynamic reconfiguration layer described herein is supported in part by guest pages not being "wired" to a particular node. This allows for evacuation pages from a node to be possible at all times. As a note, transfers of data into or out of a guest page do not "wire" the page. In some embodiments, transfers, whether by a VCPU or I/O emulation, are performed as a unit operation that holds the guest page in memory only long enough to complete the transfer.

VCPUs may migrate to a different logical node whenever they stall. To evacuate any VCPUs that happen to be on a node, a stall is invoked, and upon that stall, a migration of the VCPU takes the VCPU off of the node. Similarly, virtual pages may be removed at any time to another node, by an operation that moves the owner of the page. For pages that are secondary copies (e.g., of read only pages), these pages may be deleted without transferring the page anywhere.

In one embodiment, evacuation of all virtual pages is performed by looping over all pages in the node, and sending each guest virtual page to another Operational node in the software-defined server. Similarly, in one embodiment, evacuating of all VCPUs is performed by looping over all VCPUs in the node, triggering stalls that force each VCPU to move to another Operational node.

Two example issues to be dealt with during evacuation while the software-defined server is operating are: resource tracking and migration blocking.

Resource tracking problem: In some embodiments, all virtual resources (e.g., VCPUs, virtual pages, and virtual I/O devices) are tracked by a distributed resource-tracking algorithm that keeps track, on each node, of where the resource was last sent. In one embodiment, tracking data includes a chain of node pointers that are followed to find a resource that is not on the current node. When a resource is moved during evacuation, other nodes in the system may still be operating under the assumption that the resource is on the evacuated node. Consequently, the evacuated node may receive requests for those resources that have moved. Typically, these messages would be forwarded to the node to which the resource has been moved, but this may not be possible once the evacuated node becomes non-operational.

Migration blocking: In some embodiments, in order to complete or finish evacuating a node, resources should not move to that node. Consequently, other nodes should be notified to not send resources to the evacuating node.

The above two example issues are addressed using the following example evacuation process, which proceeds in multiple steps, as follows:

A. The evacuated node informs all nodes that it is no longer a destination for migration of VCPUs, guest virtual pages, or virtual I/O devices. The evacuated node may still receive requests for resources, which the node (or hyper-kernel on the evacuated node) handles or forwards as appropriate during the evacuation phase.

B. The evacuated node then begins evacuating pages, VCPUs, and virtual I/O devices that are present.

C. Each evacuated resource generates a special location update message, which is broadcast to all other nodes by the evacuated node, indicating that a resource has moved from the evacuated node to the new node (i.e., a message that notifies other nodes of the updated location of the resource). In some embodiments, evacuation location updates are bundled into messages (e.g., of medium size, or any other size, as appropriate) on the interconnect, reducing the overhead on the interconnect (e.g., to a small ~16 bytes/resource).

D. Upon receiving an evacuation location update for a resource R moved to node N from evacuated node E, a node checks where it believes R is, and if it is E, then the node accepts N as its new location for the resource R.

E. When evacuation of node E is complete, E broadcasts an evacuation complete message (indicating completion of the evacuation of resources) and waits for response from all other nodes (acknowledging receipt of the evacuation completion message).

F. When a node receives an evacuation complete message from node E, it scans its own local tables to verify that no resource is now thought to be on E. If that is true, the node responds with an evacuation OK message. If not, then the node sends one or more evacuated location request(s) for locations of all resources still thought to be on E.

G. When E receives evacuation OK messages from all nodes, node E moves out of the Operational state. While waiting for the evacuation OK messages, node E handles evacuation location request(s) responding with evacuation location update messages.

In some embodiments, I/O mobilization supports the ability to allow a virtual I/O device to be re-bound to a different logical module on a different node. There are two bindings that are involved: virtual-to-logical, and logical-to-physical. A virtual I/O device is mobile—it may be accessed from any VCPU, and the virtual I/O device may access any virtual page without having to move the logical module or physical devices used in its implementation. Consequently, in one embodiment, the evacuation process handles the virtual I/O devices, whereas the logical device bindings are handled by the logical module binding's move from one physical node's components to another.

Embodiments of dynamic reconfiguration of a multi-server distributed computing architecture, such as a software-defined server, have been described. Hardware modules may be added, substituted, and removed from a running software-defined server system transparently to the guest operating system and running workloads. Fault tolerant nodes may be removed for service when running in a degraded mode. Substitution for managed I/O devices from a running software-defined server may be performed with minimal or no impact, while the guest system continues to run. Resilient storage volumes and network interfaces are migratable among nodes.

Using the techniques described herein, a system may be reconfigured while it is running, which has various benefits over existing data center solutions, for example, by enabling continuous availability while replacing and repairing modules in a degraded state.

Using such protocols, the reliability of the software-defined server may be improved, as well as the ability to scale the software-defined server to fit the needs of the application being run (by being more efficient/less wasteful with the utilization of computing resources).

Figure 12:
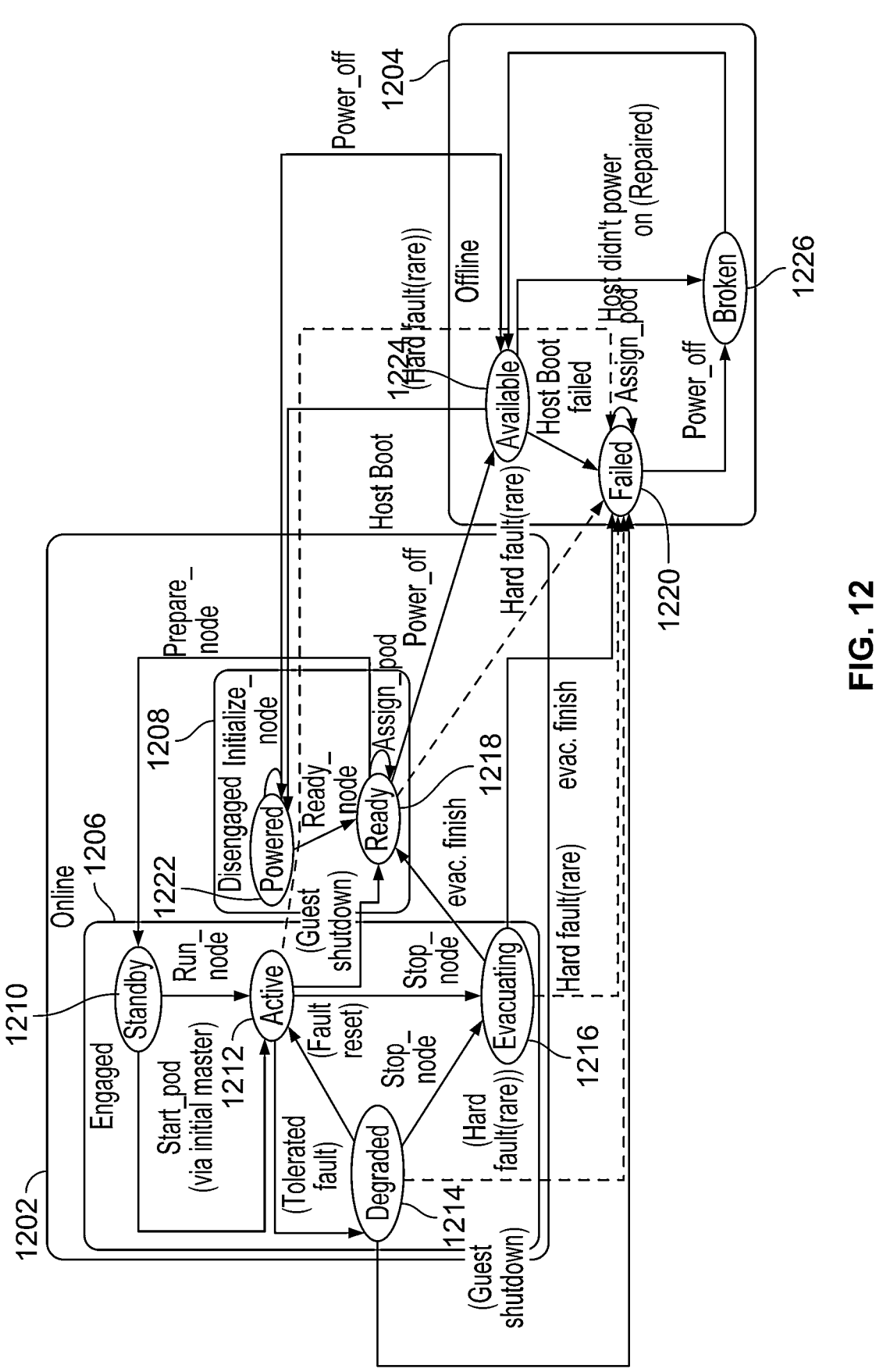
FIG. 12 illustrates an embodiment of an operation state transition diagram for a node.

FIG. 12 illustrates an embodiment of an operation state transition diagram for a physical node. In this example, a node may be either online (1202) or offline (1204).

When a node is online, it may either be engaged (1206) as part of a software-defined server (also referred to herein as a "pod"), or online but disengaged (1208) from a pod.

As shown in this example, when a node is engaged with a software-defined server, the node may be in either the standby state (1210), the active state (1212), the degraded state (1214), or the evacuating state (1216).

When in the standby state, the node may transition to the active state when the software-defined server is started (e.g., via an initial master) or the node is run. When in the active state, the node may transition to the degraded state if a tolerated fault occurs, or may transition to the ready state (1218) in a disengaged mode when the guest is shutdown. When in the active state, the node may also transition to an evacuating state if the node is stopped (e.g., is to be removed due to thin provisioning). When in the active state, the node may also transition to a failed state (1220) of the offline mode due to a hard fault (which may be rare).

When the node is in the degraded state due to a tolerated fault, the node may transition either to the evacuating state when the node is stopped, or transition to the failed state (1220) of the offline mode due to a hard fault (which may be rare) or due to guest shutdown. From the degraded state, the node may also transition back to the active state if the fault is reset.

When the node is evacuating, the node may transition either to the ready state of the disengaged mode or the failed state of the offline mode when evacuation of virtualized resources is finished. The node may also transition from the evacuating state to the failed state of the offline mode when a hard fault occurs.

In the online but disengaged mode, the node may be in either the powered state (1222) or the ready state (1218). From the powered state, the node may transition to the ready state if the node is ready. The node may stay in the powered state if the node is initialized. The node may also transition from the powered state to the offline but available state if the node is powered off.

From the ready state, the node may transition to the standby state of the engaged/online mode when the node is prepared. The node may also stay in the ready but disengaged state when the node is assigned to a software-defined server. The node may also transition from the ready state to an offline but available state (1224) when the node is powered off. The node may also transition from the ready state to a failed offline state when a hard fault occurs.

When the node is offline, it may be either in the available state (1224), the failed state (1220), or the broken state (1226). When in the offline available state, the node may be transitioned to the disengaged powered state if the host is booted. If the host boot fails, then the node is transitioned from the available state to the failed state. If the host did not power on, then the node transitions from the available state to the broken state.

In the failed state, the node may transition to the broken state if it is powered off. The node may stay in the failed state when it is assigned to a software-defined server.

In the broken state, the node may transition to the available state if the node was broken but has been repaired.

Preventative Maintenance Plans

In some embodiments, using the reconfiguration mechanism described herein, preventative maintenance programs may also be established to improve system reliability. For example, as described above, systems, when new, typically work well, but suffer from performance degradation as the system becomes older.

Figure 13:
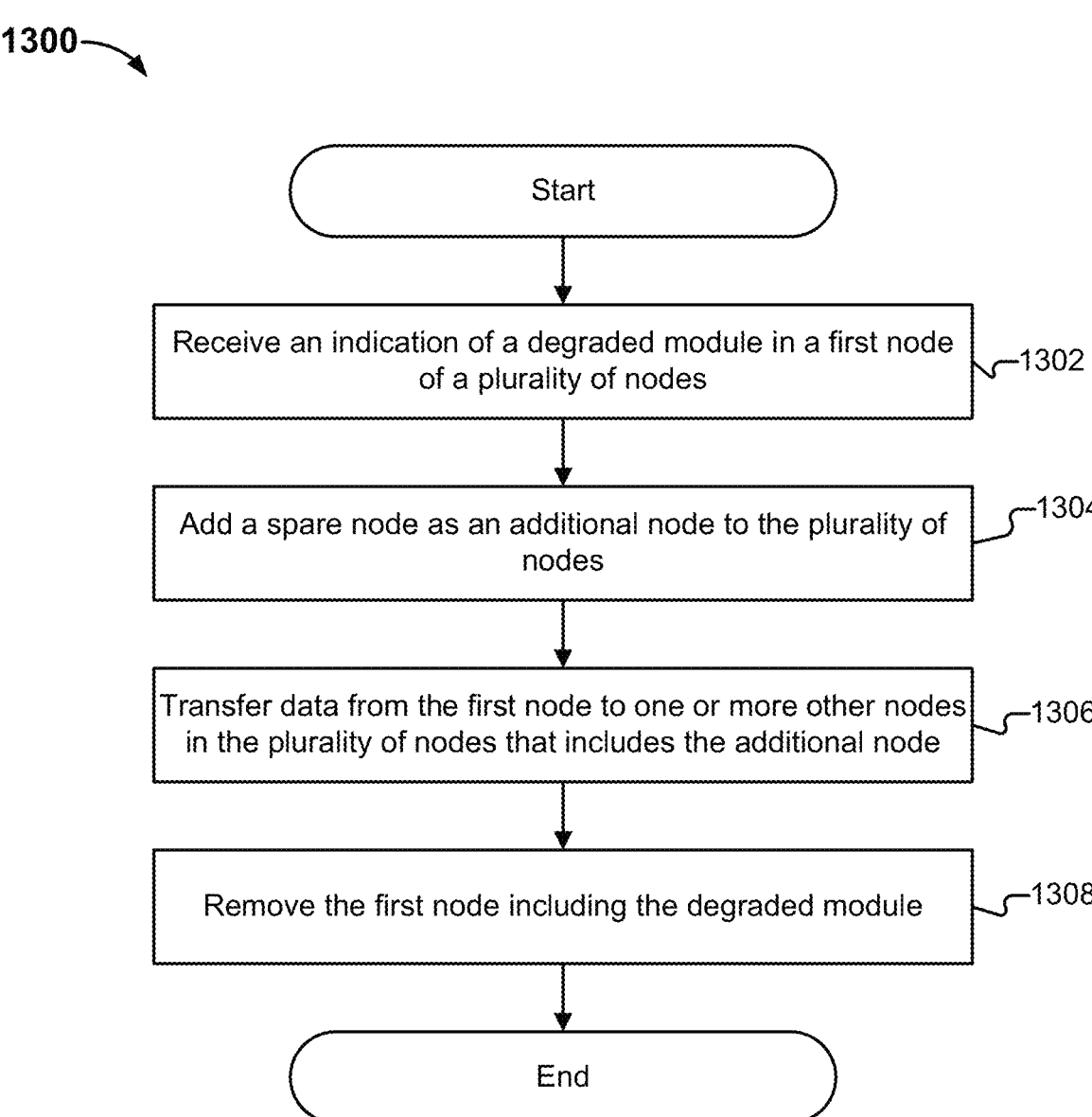
FIG. 13 is a flow diagram illustrating an embodiment of a process for removing a failing node.

As one example of a preventative maintenance program, swapping of server nodes may be scheduled on a time driven basis (e.g., every year). Using the dynamic reconfiguration techniques described herein, such server nodes and their components may be swapped out while the system is running, maintaining high availability of the system. This ability to reconfigure the system while it continues to run and provide such high availability without any downtime is an improvement to existing data centers. Typically, taking down the operating system and application that is running in a large data system may take hours to even days. There would also be the time needed to perform repairs and then restart the system. Using the techniques described herein, the system does not need to be taken down. Rather, one part of the system (e.g., a server node) is taken down and removed (e.g., from a server rack), and replaced if needed (e.g., to replace physical host componentry used to implement virtualized resources), all while the system remains up and running FIG. 13 is a flow diagram illustrating an embodiment of a process for removing a failing node. In some embodiments, process 1300 is executed by a software-defined server. The process begins at 1302 when an indication is received of a degraded module in a first node of a plurality of nodes that form the software-defined server. At 1304, a spare node is added as an additional node to the plurality of nodes. At 1306, data is transferred (e.g., evacuated) from the first node to one or more other nodes in the plurality of nodes that include the additional node. At 1308, the first node including the degraded module is removed.

Thus, in one embodiment, a degraded module is dealt with as follows. A spare node is added. Data is transferred from the failing (degraded) node to one or more other nodes in the software-defined server. The failing node is removed and repaired/replaced. As another example, the state of a degraded I/O module is moved to an I/O module on another node, where the failing node is replaced and repaired.

One benefit of this fault tolerance mechanism is that with available spare nodes, the hardware of the software-defined server can "fail in place," which is important to datacenter operations so that scheduling repairs may be batched.

Removing Nodes

In some embodiments, removing a logical node includes relocating all logical modules elsewhere and evacuating all virtual resources from the logical node being removed. The process for removing a node may be performed as part of handling a fault to a physical component (e.g., removing a degraded node), thin-provisioning down a software-defined server (e.g., removing a node from an under-utilized system), etc.

FIG. 14 is a flow diagram illustrating an embodiment of a process of removing a node from a multi-server distributed computing architecture. As one example, the multi-server distributed computing architecture includes multiple physical nodes, where an operating system is executing collectively across the physical nodes, and where an application is running on the operating system. In some embodiments, process 1400 is executed by a distributed hyper-kernel. The process begins at 1402 when a request is received to remove a first node in the plurality of physical nodes. At 1404, in response to the request, and while the application is running, virtualized resources associated with the first node are evacuated to one or more other nodes in the plurality of physical nodes. At 1406, subsequent to the evacuation of the virtualized resources, the first node is removed from the plurality of physical nodes.

Adding Nodes

In some embodiments, adding a logical node includes relocating logical modules to include components on the new node as needed, and allowing virtual resources to move to and from the new node. The process for adding a node may be performed as part of handling a fault to a physical component (e.g., adding a spare node), thin-provisioning up a software-defined server (e.g., adding an additional node to a loaded system), etc.

FIG. 15 is a flow diagram illustrating an embodiment of a process for adding a node to a multi-server distributed computing architecture. As one example, the multi-server distributed computing architecture includes multiple physical nodes, where an operating system is executing collectively across the physical nodes, and where an application is running on the operating system. In some embodiments, process 1500 is executed by a distributed hyper-kernel. The process begins at 1502 when a request is received to add a node to the plurality of physical nodes. At 1504, at least in response to the request, and while the application is running, an additional node is added to the plurality of physical nodes. At 1506, at least one other node in the plurality of physical nodes is notified of the addition of the additional node. Virtualized resources are migratable to and from the additional node.

Fast Restart of Large Memory Systems

Described above is a hardware and software architecture (also referred to herein as a "software-defined server" or "SDS") in which a series of tightly coupled clusters of servers (also referred to herein as a "TidalPod") share an aggregated set of resources. These resources include several types: processors, dynamic memories, storage, and networks. The aggregation of these resources by a set of hyper-kernels (an example of a distributed hypervisor or virtual machine manager, as described above) running on the interconnected computing nodes (aforementioned cluster of servers) in such a system allows for the construction of a virtual machine that spans the set of nodes and appears to a guest operating system and to applications as a single large server.

Described herein are techniques for fast restart of large memory systems. Using the techniques described herein, a Software-defined Server (SDS, such as that described above) can be restarted very quickly after a fatal software crash in the guest virtual machine. The SDS supports very large memories. Although there are many advantages to using large memories, one potential issue in some systems with large memories is that if the guest system crashes, it may take a long time to configure the system so that it performs as well as it did before the crash. This may be thought of as warming up a system, similarly to a cold car that would be warmed up before driving on the highway. The fast restart techniques described herein address this problem. The techniques described herein require no changes to the operating system, the database, or any application.

To address the desire for large memory systems, the SDS described herein creates an ability to have very large memories to facilitate technologies such as in-memory databases, machine learning, fast analytics, and decision support. Use of large memories also has the additional benefit of simplifying software development by allowing a user to scale up conventional programs without having to rewrite them as complex distributed algorithms, as is often seen in practice. Using the SDS, large amounts of data can be stored in a single large conventional main memory. Another advantage of large memories is that by using them, the need to use paging of virtual memory to disk can be reduced or eliminated, greatly reducing overhead and thereby increasing overall performance.

As the SDS is a virtual system, the following are various ways in which main memory is referred to herein:

Guest virtual memory—in some embodiments, this is the memory seen by normal applications running on normal modern operating systems. These (guest) operating systems believe they are managing virtual memory by mapping the virtual memory to physical memory. However, in the SDS this is an illusion.

Guest physical memory—this is, for example, the memory that is managed by the (guest) operating system running on the virtual environment defined by the hyper-kernels in the software-defined server. The (guest) operating system believes that guest physical memory is real memory. However, in the SDS, this is also an illusion.

Real physical memory—this is, for example, real DRAM (Dynamic Random-Access Memory) memory. The mapping between guest physical memory and real physical memory is managed by the SDS hyper-kernel, as described above.

Modern processors have features to help virtual machines perform well. Among these features are multiple levels of hardware address translation. When the processor sees a reference to virtual memory, it translates that address into a guest physical address using the first level of page tables. When virtualization features are enabled, such as with the SDS, that guest physical address is then further translated to a real physical address using a second level of page tables.

Described above are embodiments of a dynamic reconfiguration framework that allows the SDS to seamlessly recover from impending hardware failures or scheduled server maintenance. Software failures in operating systems and software applications can also occur, and unlike the hardware failures alluded to above, software failures can happen virtually instantaneously, resulting in a software crash (or panic). In this case, there is little to no time for the guest to take corrective action.

Large memories can greatly lengthen the time to restart after a software crash. When a system restarts, it normally clears all DRAM and resets the entire state of the memory system, and so all of the intermediate state of the computation prior to the crash is lost. Simply reloading DRAM from the backing store would require keeping the backing store exactly synchronized with memory, which would incur a great deal of overhead, and is unnecessary. It could greatly slow down the guest system with a large amount of guest physical memory. In fact, the more memory the guest system has, the longer it could take.

In many enterprise mission critical software systems, to recover from these software crashes, certain applications and subsystems regularly use a system of checkpoints and logs to mitigate the effects of the crash, particularly to prevent loss of transactions managed by enterprise database systems. This capability prevents transaction loss, but does not materially affect the speed with which a system can recover from the crash.

When an operating system or key application panics, this occurs instantaneously, causing a computer system to immediately fail. Described herein are techniques for maintaining state and allowing for fast reboot. While the memory state monitoring and restart techniques described herein are described in the context of software-defined servers for illustrative purposes, the memory state monitoring and restart techniques described herein may be variously adapted to accommodate any other type of computer system, as appropriate.

In typical unvirtualized systems, when an operating system crashes and then reboots, one of the initial steps is to clear physical memory. For example, zeros are written to memory. Given that the memory that is written to is physical memory, any system state that had been collected prior to the crash is eliminated. This state is the state of the entire system, such as the state of the operating system, the state of the caches, etc. As the physical memory is reinitialized in existing systems, when the guest operating system reboots, it reloads by requesting data from disk, such as SSD, hard disk drives, or other stable storage stored locally or remotely.

Rebuilding memory contents to arrive back at the operating point/state where the computer system was prior to the crash, and operating at previous performance levels, can take a significant amount of time. Thus, it is not only powering on the system and rebooting it. The rebooting process must run for a period of time in order to warm up processor and memory caches to achieve previous performance levels. In the case of a software-defined system, this includes also placing the appropriate pages on the appropriate computing nodes. This process may take a significant amount of time.

In some embodiments, the memory state monitoring and restart techniques described herein leverage the intermediate virtualization layer provided by the hyper-kernels to facilitate rapid rebooting of enterprise computer systems. For example, even if the guest operating system and guest applications crash, this does not mean that the pages in physical memory are gone.

For example, when the guest operating system crashes and reboots, it is the guest physical memory that is wiped. However, due to the virtualization layer provided by the distributed hyper-kernel, the actual data that was in physical memory at the time of the crash need not be physically wiped and may still be present in physical memory. Rather, the zeroing of guest physical memory may be performed by representing such pages of guest physical memory as what is referred to herein as dormant pages, for example. From the perspective of the guest operating system, what it believes to be physical memory (which is in actuality guest physical memory) has been zeroed, while the actual physical memory in the computing nodes has not been wiped (or need not be wiped). In this way, the state of the physical memory is the same as it was prior to a crash.

Using the memory state tracking techniques described herein, the actual data that is present in physical memory is accurately tracked. By doing so, when rebooting after a crash, pages from physical memory may be mapped to guest physical memory, and then guest physical memory to virtual memory in the guest application space. This may occur automatically.

In some embodiments, as will be described in further detail below, the memory state tracking and rapid reboot techniques described herein are supported by a data structure referred to herein as a "storage replica table" or "SRT."

Much of what occurs when a computer system needs to reboot is that the reboot process goes out to disk and reads in the operating system, programs, etc. Data from the file system is fetched. Reading from disk is typically time-consuming. However, if it is known that such data is already present in physical memory, then reading from disk may be bypassed.

For example, the guest operating system, as part of the rebooting and rebuilding of the state, will request for blocks of data from stable storage to be written to the guest physical memory. In some embodiments, instead of going out to disk and reading in requested data from the disk, if the hyper-kernel determines that the requested data is already present in the physical memory (which was not actually wiped), the hyper-kernel may map the corresponding data in actual physical memory to the guest physical addresses. In this way, when rebooting, any requests by the guest operating system for data from disk that happens to already be present in the real physical memory may be performed as a mapping operation, allowing expensive and time-consuming disk accesses to be skipped or avoided. This provides faster and more efficient rebooting of large memory computer systems.

In some embodiments, such a mapping is done on an on-demand basis, where it is not necessary to pre-plan where blocks of data are mapped to. Rather, the storage replica table described herein may be used such that when a guest operating system asks for a page or for a portion of a file system, the storage replica table may be accessed to determine whether a copy of that page is already in physical memory. If so, then the corresponding page(s) already present in physical memory are automatically and quickly mapped to the appropriate guest physical addresses. Performing such a lookup of the storage replica table and mapping of a page of physical memory to a guest physical address is much faster than going to disk, as would occur in existing reboot processes.

As will be described in further detail below, there are various operations for which the storage replica table is accessed, and in some cases, may be updated. For example, in some embodiments, in order to facilitate such memory state tracking, whenever data is written to the disk (e.g., when the guest operating system and guest applications are running under normal operation), such data is kept track of in the storage replica table. For example, suppose that the guest writes to a page that corresponds to a special page that represents some state on stable storage. The hyper-kernel is configured to capture such an access. For example, this may be performed when accessing second level page tables. When a write request or other I/O action occurs from the guest environment, this information is captured by the hyper-kernel, which updates the storage replica table. The requested write to disk is then completed.

During regular operation, the guest may request pages of memory for which there might already be a copy in physical memory. The guest may update pages, in which case the hyper-kernel tracks such updates, and in some embodiments, marks the update as an entry in the storage replica table before the write to disk is performed.

In some cases, such as for maintenance or for resource scaling, a computing node may be removed from a cluster. In some embodiments, as the removal of a physical computing node includes the removal of physical memory in the computing node, the storage replica table is updated. In some embodiments, the storage replica table is a single table that maintains the information being kept track of. In other embodiments, the storage replica table is a distributed table or data structure, where portions of the storage replica table exist on each of the nodes in the cluster.

Further details and embodiments regarding the storage replica data structure, as well as how it is accessed and updated, are described below.

Storage Replica Data Structure

The following are embodiments of the storage replica data structure usable to allow the hyper-kernel to assist and facilitate in restarting the system very quickly after a crash. An example set of data structures to provide such capability is described below.

First, as one example, a table is implemented/configured that provides a mechanism to associate real physical memory with blocks of stable storage and guest physical addresses. In one embodiment, this table, also referred to herein as the Storage Replica Table (SRT), is a table of rows of associations. The SRT may be implemented in a variety of ways. One example implementation of the SRT has three columns: stable storage address, (real) physical memory address, and guest physical memory address. While the SRT may be conceptually thought of as a single table, in some embodiments, the SRT is implemented as a distributed table, to account for guest physical pages that may migrate from node to node. In some embodiments, each computing node in the SDS has a local copy of that part of the whole SRT that pertains to that computing node. In some embodiments, when a guest physical page moves from one node to another, the corresponding entry in the SRT also moves. In some embodiments, when a page is copied, the corresponding entry in the SRT is also copied. Further details regarding the distributed storage replica table are described below.

The SRT may be a sparse data structure in practice. Not every page of guest physical memory needs to be represented in the SRT. In some embodiments, the SRT is a cache, so if the SRT does not contain an entry, a new entry can always be reconstructed. In some embodiments, and as will be described in further detail below, a bit of metadata is maintained that associates with an entry in the extended page table.

In some embodiments, the storage replica data structure is implemented as a table data structure. FIG. 16 illustrates an embodiment of a storage replica table. As shown in this example, the storage replica table includes three columns. In this example, column (1602) is a column of disk or stable storage or persistent memory addresses (e.g., logical block addresses). Column (1604) is a column of physical memory addresses corresponding to those disk addresses. Column (1606) is a column of guest physical memory addresses. While a table data structure is described herein for illustrative purposes, the techniques described herein may be variously adapted to accommodate other types of storage replica data structures. An example entry in the storage replication table is shown at 1608. In this example entry, Disk address= [14, 0x3274] (indicating disk number 14, logical block address 3274 in hex on that disk); Physical address=[3, 0x123456] (indicating 4K page number 123456 in the physical address space on node 3 in hex); Guest physical address=0x235678 (indicating 4K page number 235678 in hex in the guest physical address space in the software-defined server). In some embodiments, depending on the implementation, the node number may be omitted if the physical address is interpreted locally on the node, and the node number is therefore implied.

In some embodiments, the storage replica data structures are in the hyper-kernel virtual machine management layer, and are protected data structures that are invisible to the guest environment (where the guest environment believes it has been running on bare metal). In some embodiments, the guest does not have access to the storage replica data structures (as this may be insecure and unreliable).

Distributed SRT

As described above, in some embodiments, the storage replica table is distributed across computing nodes in a cluster. In some embodiments, the distributed SRT is stored in real physical memory on the computing nodes that is not visible to the guest. As one example, the storage replica table is a private hyper-kernel data structure that is not modifiable by the guest environment. This may be supported by modern processors.

In some embodiments, each computing node in the cluster has a sub-storage replica table corresponding to that node's physical memory. That is, in some embodiments, each computing node has a portion of the distributed storage replica table. In some embodiments, the portion of the distributed storage replica data structure that a computing node stores is those entries/rows whose triples have real physical memory addresses that belong to that computing node. For example, the portion of the SRT on node 1 is used to maintain triples for which the real physical memory address is on node 1. For entries present in the SRT on node 1, for every triple that has a physical memory address for node 1, there will be logical block addresses for the file system, and for guest physical memory. Similarly, the portion of the SRT on node 3 is used to maintain triples for which the real physical memory address is on node 3. The sub-table on node 2 will have entries for which real physical memory addresses belong to those on node 2.

Thus, in some embodiments, there is logically one SRT that is implemented in a distributed manner across computing nodes in the cluster of a software-defined server.

As will be described in further detail below, page migration is one type of operation that may result in the updating of affected sub-storage replica tables. For example, suppose that a page migration occurs from node 1 to node 2. For example, the contents of the page of real physical memory that underpins a guest physical memory address is migrated from node 1 to node 2. If there had been an entry for the guest physical memory address in the sub-SRT of node 1, that entry is cleared from node 1's sub-SRT. A new entry is created in the sub-SRT of node 2, where the entry includes a triple with the same guest physical memory address and corresponding logical block/stable storage address, but with a different real physical memory address (which will now be an address for real physical memory on node 2).

As another example, as the SRT is distributed, in some embodiments, if a computing node is taken out of operation (e.g., due to dynamic reconfiguration, as described above), that node's portion of the SRT is copied and/or rebuilt.
Synchronizing and Maintaining Consistency of the SRT The following are examples and embodiments of operations on data structures such as the storage replica table that may be used, as will be described in further detail below, by the hyper-kernel to assist in processing such as restarting the guest virtual machine very quickly after a crash.

Modern processors supporting virtualization allow an SDS such as that described herein to be created, which is a virtual machine that emulates a real machine. In some embodiments, this is facilitated through the use of several features. For example, in some embodiments, the SDS traps privileged instructions including I/O instructions, manages extended page tables, and controls many other aspects of a virtual machine at a fine level of control. For example, through these features, the hyper-kernel can know at all times when pages of guest physical memory are updated so that it can maintain strong cache coherency among all the guest physical pages and associated caches. In some embodiments, similar processing occurs also for translation lookaside buffers. In particular, in some embodiments, the hyper-kernel can track every write to stable storage from the guest through the hyper-kernel using these virtualization capabilities. By keeping track of the writes to pages that are represented in stable storage, or writes to stable storage that are represented in physical memory, stable storage and physical memory can always be made consistent, as will be described in further detail below.

There are several example operations that can result in changes to the SRT:

1. In some embodiments, when a guest physical page is updated by writing into the page, if a metadata bit, as described in further detail below, is set (which indicates that the guest physical memory address of the guest physical page is in an entry of the SRT), the page is looked up in the SRT. In some embodiments. in addition to the other hyper-kernel actions that are taken when a page is updated, all rows containing that guest physical address in the SRT are removed, and all the local corresponding pages that are aliases are invalidated, since the contents of the page with that guest physical address no longer agree with the corresponding block of physical storage.

2. In some embodiments, if there is a write from guest physical memory to stable storage, which is trapped by the extended page tables, it comes from some block of guest physical memory and real physical memory that contains that information. In some embodiments, the SRT is then updated so that it now has that real/host physical address, the guest physical address, and the location in stable storage that again is its clone after the write completes.

3. In some embodiments, if there is a read from a guest physical page which has a corresponding entry in the SRT, no I/O is needed, and no updates to the SRT are needed.

4. In some embodiments, if there is a read from a block in stable storage to a page of real physical memory and perhaps guest physical memory, and if that block is found in one or more places in the SRT, the real physical memory address is used and is then mapped to the guest physical address. In some embodiments, an I/O operation is not needed since real physical memory has a valid copy of stable storage, and the entries in the SRT are valid.

5. In some embodiments, if dynamic reconfiguration of the SDS is being performed, there may be occasions where physical addresses in the SRT are no longer valid, for example, if the node containing that real physical address is removed from the SDS. In this case, in some embodiments, the SRT is reconfigured accordingly. In some embodiments, if the SDS is reconfigured by adding a node, a local instance of the SRT is also created. In some embodiments, if a node is being removed, the local portion of the SRT on the node being removed is also removed. Further examples of updating a distributed SRT are described below.

Further Embodiments of Maintaining SRT
Consistency

As described above, in some embodiments, the storage replica table includes three columns. One column corresponds to guest physical memory addresses, another column corresponds to real physical memory addresses, and another column includes addresses of blocks on (stable) storage. In some embodiments, a row in the table is a triplet, where the guest physical memory address in the row is mapped to the real physical memory address in the row (where the physical memory at that address underpins the guest physical memory at the guest physical memory address), and the real physical memory address in the row has a copy of the data that is at the stable storage address in the triplet.

In some embodiments, the memory state tracking techniques described herein include techniques for synchronizing and maintaining consistency of the storage replica table. This includes maintaining the consistency of triplets in the storage replica table. In some embodiments, the distributed hyper-kernel or virtual machine manager is configured to keep the various addresses synchronized.

In some embodiments, maintaining consistency includes monitoring, during regular operation (e.g., as a guest operating system and/or applications are running), operations for which the SRT should be updated. Such operations include those that access stable storage, update guest physical memory addresses, or would affect the validity of existing entries/rows in the SRT. The process of keeping the storage replica table consistent is part of an ongoing process to keep each row of the storage replica table consistent.

In some instances, some physical memory DIMM might be disabled, because it has become unreliable. In some embodiments, in response to physical memory becoming disabled, the SRT is updated. In some embodiments, updating of the SRT depends on the hardware features that take a DIMM out of normal use.

In some embodiments, to keep each row in the storage replica table of triples consistent, the hyper-kernel is configured to trap I/O (input/output) operations. Updates to guest physical memory (which would result in updates to host physical memory backing the guest physical memory) are also tracked.

In some embodiments, when a page of guest physical memory is updated, the hyper-kernel determines whether that page of guest physical memory is present in the storage replica table. One reason for the check is because entries in the SRT are representative of guest physical memory addresses that correspond to some block on disk. If a page of guest physical memory is being written to, and there is an existing entry in the SRT, then this indicates that there is a correspondence between the guest physical memory address and a block on disk (that is, the guest physical memory address is mapped to a host physical memory address that has a copy of data at a block on disk). If the page of guest physical memory is updated, then the SRT will no longer be representative (e.g., because the backing host physical memory will be written with data that is no longer a copy at the block on disk that is in the existing SRT entry). For the updating of the guest physical memory at that address, the disk has not been written to yet (and may not be written to, as updating of a guest physical memory address does not necessarily involve an I/O operation to disk). However, the page of guest physical memory has just been updated, so it should be removed from the SRT in order to prevent the SRT from becoming inconsistent. That is, the page of guest physical memory being updated should no longer be in the SRT because it has been updated (and it may map to a new, different, physical memory address and/or even a block on disk).

If a page of guest physical memory is in the SRT, then the three elements—the triplet of logical block address on disk, real/host physical memory, and guest physical memory—must always be consistent. If an update is made to a page of guest physical memory in the triple (and is being written to), the triple is no longer consistent and is removed from the SRT (unless, for example, the update is because of a disk read). That is, in some embodiments, an entry involving the guest physical memory address being written to is removed from the SRT.

If that updated page of guest physical memory is written to disk at some point (which may occur for various reasons, such as being a part of the database, but might not), such as because the application requests that the page of guest physical memory be written to disk, if the hyper-kernel determines that there is no entry for that guest physical address in the SRT (which means that the data in the guest physical address is not also in the disk), then a new entry is created for the guest physical 50dderss. In this way, the SRT maintains a list of pages of guest physical memory that have data that is representative of pages on disk, and also have a page in host physical memory.

There are various transactions that may need to cause updates to the SRT to maintain consistency. For example:
    guest physical pages that are present in the SRT may be written
    disk blocks may be read into guest physical pages that cause updates to the SRT
    pages may migrate away from or arrive at a node
    a node may be added or removed from an SDS In all of the above example cases, the SRT must always be kept consistent before control is returned to the guest.

The following is an example of updating entries in the SRT. In this example, suppose that the guest writes into a page in guest physical memory. There is a corresponding portion of real or host physical memory that is actually written to. Suppose that an I/O operation is to be performed, where that page of guest/host physical memory is to be written to disk. In some embodiments, at this point of the write, an entry in the storage replica is created, which includes generating a triple of the location on disk that corresponds to this guest physical address and its corresponding backing real physical address.

As one example, suppose that there is a guest program running on the guest environment that fills a block of disk space with all ones and then with all twos. The program writes those pages to various blocks in the file system. In this case, the application may reuse the same page of guest (and host) memory for the ones and twos. However, each time, the page is written to a different block on disk (different location in stable storage, for example). In this example, the page at the guest physical address, which contains all ones, is written to a first block of disk. Because a write has been made to disk, an entry is created in the SRT, where there is a triple involving the guest physical address, its corresponding host physical memory address, and the location of the first block in disk. Here, the guest physical address is representative of data at the location of the first block in disk.

Now suppose that the same page at the same guest physical address is then updated to contain all twos, and is written to a second block of disk, different from the first location on disk that has all ones. At this point, in order to maintain consistency of the storage replica table, that entry that included a mapping between the guest physical address and the first block of disk is erased (as the guest physical address no longer corresponds to the first block in disk, but the second block on disk now). Because the guest physical address is updated with all twos and is also written to the second block of disk, a new entry is created in the SRT that includes the same guest physical address, its corresponding backing host physical memory address, and the location of the second block on disk. Here, the guest physical address is representative of data at the location of the second block on disk.

Now suppose that the same page of guest physical memory at the guest physical address is reused and updated with a new value, but there is no write or I/O operation made to the disk. In this case, the guest physical address is no longer representative of the location of the second block on disk. That is, the correspondence between the guest physical address and the location of the second block on disk is no longer valid. The entry that included a mapping between the guest physical memory address and the location of the second block on disk is deleted from the SRT to maintain consistency. In this case, there is no entry or triple in the SRT that includes the guest physical memory address, as it is no longer representative of data in any location on disk. Consistency has therefore been maintained between the guest physical memory (and its backing host physical memory) and the disk. Thus, even if the same guest physical address is reused, it may correspond to different blocks on the disk at various times. The SRT maintains the current valid mapping or correspondence (if any) between guest physical memory addresses (which are backed by corresponding host physical memory in regular operation) and locations on disk. Further, the page of guest physical memory may or may not have the same page of real physical memory backing it. This may be because of the I/O subsystem.

The following is another example of updating a storage replica data structure. As shown in the example above, if the guest operating system were to write new data into that page of guest physical memory, but did not perform a corresponding write into the disk, then that means that the data in that location of the disk in the triple is no longer the same as what is in the page of guest physical memory (and is no longer consistent). That is, pages of memory may be reused and updated for various reasons at various times, and not all pages updated in guest/physical memory correspond to locations on disk (because not all pages of memory are necessarily written to disk).

In this case, to avoid inconsistency between the guest physical address and the location on disk, when that page of memory is updated, the SRT is updated by removing the triple for that guest physical memory address/location on disk.

Maintaining SRT Consistency in the Context of Page Migration

In a software-defined server, pages of guest physical memory may be migrated between computing nodes. In this case, the guest physical page may be migrated to another computing node and backed by another, different portion of physical memory on a different computing node in the cluster. In this case, moving an active page of guest physical memory from one node to another changes the mapping of the page of guest physical memory (its guest physical memory address) to a real physical memory address.

For example, suppose that the guest physical memory address is initially or currently mapped to a real physical memory address on node 1. The guest physical memory address is then migrated to computing node 3. The guest physical memory address will now, subsequently, map to a completely different real physical memory address (that is on a different computing node). In some embodiments, the SRT is evaluated and updated as needed in order to maintain consistency of all triples in the computer system.

For example, if ownership of a page of guest physical memory migrates from one node to another, but the guest physical memory still corresponds to the same logical block address in the file system, an existing entry in the SRT prior to the migration would now be incorrect after migration because the real physical memory address corresponding to the guest physical memory address has changed due to the migration. That is, even though the guest physical address and logical block address in the triple would not change (because the migration would not change the guest physical address or the corresponding logical block address), the real physical memory address is now different, and the existing triple on node 1 would no longer be valid.

As described above, in some embodiments, the SRT is distributed. In some embodiments, in order to maintain consistency of the triples in the SRT, the local SRTs at computing nodes are also updated when page migrations occur. As one example, if an active page of guest physical memory is moved from computing node 1 to computing node 3, then the existing triple in the local SRT of node 1 that includes the guest physical memory address is cleared and recreated in the local SRT of node 3, where the guest physical memory address and the logical block address will be the same in the new entry on node 3, but the real physical memory address will be different (and be an address of a portion of host physical memory on node 3). In this case, migration causes an update to the real physical memory address in the triple, and thus, the SRT should be updated. In this case, to maintain consistency, the entry on the sub-SRT of node 1 is removed, and a new entry is created in the sub-SRT of node 3.

Embodiments of Determining Whether a Guest Physical Address is Included in the SRT As described above, updates to guest physical memory addresses may trigger evaluation of the SRT to determine whether there are any entries in the SRT that should be updated (e.g., cleared or new entries created). In some embodiments, this includes scanning the SRT for the guest physical memory address.

In some embodiments, as an optimization, a metadata bit is implemented so that a determination of whether a guest physical memory address is in the SRT can be made very quickly. That is, the metadata bit may be used to speed up lookups for data represented in each of the three SRT columns. The use of such a metadata bit allows the fast determination of whether a block on disk corresponds to a row in the SRT, as well as similarly for guest physical addresses, and also similarly for physical addresses (for example, under migration or node addition or removal). The metadata bits may be stored in the SRT, but need not be. In some embodiments, each guest physical memory address page is associated with a set of state information (which is managed by the hyper-kernel and invisible to the guest environment). In some embodiments, the state information for a guest physical address page includes a bit or other type of flag that indicates whether the guest physical memory address for a guest physical page of memory is present in the SRT. In some embodiments, if the metadata bit is set, this indicates that the real host physical memory address corresponding to the page of guest physical memory is a clone of a block of storage.

In some embodiments, when an update to a guest physical address memory occurs (e.g., the guest physical address is being written to), the state information for the guest physical memory address is evaluated for the metadata bit that indicates whether the guest physical memory address is in the SRT. If the metadata bit is set, indicating that the guest physical memory address being updated is in the SRT, then the SRT is accessed and the triple that includes the guest physical memory address is updated (e.g., removed). If the SRT metadata bit is not set, then the SRT need not be accessed. If a write to disk occurs, then an SRT entry is created as described above, and in some embodiments, the SRT metadata bit for the corresponding guest physical address is also set to indicate that the guest physical memory address is present in the SRT.

Using the Storage Replica Table during Reboot/After a Crash

The following are embodiments of fast restart techniques that greatly increase the speed to restore a system following a crash.

When restarting, the operating system should restart without sacrificing data integrity, launch the necessary applications, load transaction logs, and commit uncommitted transactions. This entails a large amount of reading and potentially some writing to stable storage. That storage could be rotating media, or it could be stored on SSDs or arrays of persistent memory. It could also be stored in an emerging storage technology referred to herein as hybrid storage. An example of such hybrid storage is Intel's 3DXpoint technology.

When a system crashes and is restarted, the (guest) operating system normally sets all guest physical memory to an initial state. However, guest physical memory is different from real physical memory, which is not managed directly by the guest operating system, but is managed by the SDS hyper-kernel. While the guest physical memory's initial state may be thought of to be filled with zeroes (from the guest operating system's perspective), in some embodiments, the hyper-kernel does not actually fill the real physical memory with zeroes at initialization (and thus the contents of the real physical memory need not actually be wiped out during initialization). Rather, in some embodiments, the hyper-kernel creates entries in the extended page tables for which it has sole control, and marks those guest pages as dormant, which is logically the same as zeroed pages from the point of view of the guest. In some embodiments, dormant pages cannot be directly read or written. In some embodiments, the guest virtual memory pages are not, in fact, actually allocated until they are needed. In some embodiments, the first time a guest virtual address is referenced (usually written into), the hyper-kernel sees that the page table entry is marked as dormant. In some embodiments, only then is that page actually allocated from a pool of available real physical memory, and the extended page table updated accordingly. This greatly aids in the speed of restarting.

In this way, when the enterprise computer system is rebooted, dormant pages are created. The real physical memory is not zeroed, and thus the contents of the real physical memory are not wiped out. That is, the state of the real physical memory prior to the crash is maintained.

In some embodiments, when, as part of the rebooting process, the operating system or the application asks for a page from disk (which includes specifying an address or location in stable storage), the hyper-kernel checks the storage replica table to see if there already exists a clone of the requested block of stable storage in real physical memory. If so, then that page of physical memory may be mapped to the appropriate guest physical memory address.

In this way, pages of physical memory need not be zeroed when rebooting, and may be reused to facilitate rapid rebooting. This is beneficial in rebooting, as there may be many pages requested by the guest operating system/application that would already be present in physical memory, such as the code for the programs that were running. When rebooting, rather than having to fetch all data from disk, the guest physical memory may be made up to date by remapping operations, which, using the techniques described herein, may be implemented as fast page table operations rather than slower disk reads.

In some embodiments, when a system crashes (e.g., the guest environment crashes), if real physical memory corresponds to a block in stable storage, the block and the memory remain valid. In some embodiments, the physical memory is an exact copy of the corresponding block in stable storage.

The hyper-kernel maintains a large amount of state, none of which is visible to the guest operating system. In some embodiments, on each node, the hyper-kernel maintains tables (such as extended page tables) that are used by hardware to map guest physical memory addresses to physical memory, as described above. In some embodiments, the extended page tables contain metadata used by the hyper-kernel to manage guest physical memory. In some embodiments, the extended page tables also contain information used by the hyper-kernel's machine learning algorithms (described in further detail above) to help optimize the placement of guest physical memory and guest virtual processors onto physical nodes which have real physical memory and real processors. This information has been built up over time prior to the crash, based on the often-unpredictable running history of jobs being run on the SDS, and it would be advantageous to preserve it. In some embodiments, since the guest operating system knows nothing about this private information, it cannot access it or destroy it, and the hyper-kernel can use it with confidence.

After restarting after a crash, since its real physical memory has not been cleared (and need not be cleared, as initialization by the guest operating system would be with respect to guest physical memory addresses, and need not affect real physical memory), the hyper-kernel might have copies of real physical memory that can be used to restart the system. In some embodiments, as part of the reboot process, the guest operating system reads pages from the file system, for example, to load pages of guest physical memory containing programs. If those pages of memory were already resident in real physical memory (e.g., because the OS loads programs from disk, for example, or parts of the operating system itself), then in that case, no disk reads actually need to take place at all. In some embodiments, the pages of real physical memory containing those portions of the file system need only be mapped into guest physical memory (i.e., made to appear in the guest environment as guest physical memory). In some embodiments, mapping is very fast relative to reading from a file system, even if the file system is located on fast storage. So, in effect, this takes near zero time since no stable storage I/O or copying is involved. Also, if a local copy of a page is needed, a copy can be transferred from another node that has a copy of that page.

As one example, suppose that the guest operating system and/or guest application running on the guest operating system has crashed. The SRT may be used to speed up the process of rebooting a computer system. For example, suppose that as part of rebooting, the guest operating system would like to obtain data from a location on disk and store that to a page of guest physical memory at a guest physical memory address.

The SRT can be accessed to determine whether there is already a page of physical memory that corresponds to the requested location on disk/stable storage. If so, then the data can be pulled from the host physical memory, rather than having to make a longer and more inefficient I/O request to read from the disk location (at a logical block address). The ability to pull data from physical memory is reliant on the validity of the correspondences and mappings maintained by the SRT. What can be pulled from physical memory rather than going all the way to disk is determined by the SRT, where the accuracy and validity of the mappings is based upon the consistency processing described above.

For example, in some embodiments, each triple in the SRT maintains an invariant. Using the consistency techniques described above, the invariants are preserved. With respect to maintaining an invariant, if there is an entry in the SRT, then a triple that has a guest physical memory address, the real physical memory address underpinning the guest physical memory address, and a corresponding logical block address (for which the host physical memory mapped to the guest physical memory has a clone) must be correct. If there is no entry, or if there is no correspondence among the three, then there is no triple in the SRT. If invariants are not maintained, then reboots will most likely fail. Incorrect writes will corrupt the computing system, and reads based on incorrect SRT entries may lower performance.

If such consistency were not maintained as described above, then the abstraction of the host physical resources breaks down, because if the system crashed with an inconsistent SRT, then the system would believe that it has a copy of what is in guest physical memory that corresponds to data on disk, which would be false. In this case, the system would operate under the assumption that it has a copy of a page, when it does not.

Suppose that a guest application running on the guest operating system is writing into a page of guest physical memory that the SRT has an entry for. That is, according to the SRT, the page of guest physical memory being written to is representative of a page on disk, as well as a page in host physical memory. However, suppose that the consistency had not been maintained. For example, a page of guest physical memory, if updated, must have a corresponding page of host physical memory underpinning the page of guest physical memory. However, suppose that the page of host physical memory in a triplet does not actually correspond to a block on disk specified in the triplet. If the computer system were to crash after that write to the page of guest physical memory, then there may be pages of host physical memory that are irrelevant and do not correspond to any block on disk.

For example, suppose a guest operating system or application is writing to a page of guest physical memory. That page of guest physical memory is represented in the SRT as a location in real physical memory and a location on the disk. However, this is not necessarily what has occurred in reality. For example, if the page of guest physical memory had just been written into, it does not exist anywhere else other than guest physical memory and the real physical memory backing the guest physical memory. It would not necessarily exist on disk because the page had just been written into. That is, if a page of guest physical memory is written into, there must be real physical memory to back up the page of guest physical memory. However, there need not be a location on disk for the data in the guest/real physical memory (because there may not necessarily be a request to write the data at the page of guest physical memory (and by extension, the corresponding real physical memory) to disk).

Additional Example of Reboot after Crash

The following is another example of rebooting the guest virtual machine using an SRT after a system crash. In this example, suppose that the guest operating system has crashed. In some embodiments, the hyper-kernel (which is assumed to have not crashed) detects the crash of the guest virtual machine. As one example, when an operating system enters a certain state indicative of crashing, the operating system may make a panic system call. In some embodiments, the hyper-kernel tracks or monitors for this system call. In this way, the hyper-kernel is able to detect when the guest environment crashes.

Typically, when a computer system crashes, the system starts rebooting immediately. In the example of an SDS, in some embodiments, a virtual processor will begin to start rebooting the guest operating system. The computing node that has (e.g., is hosting) that virtual processor will have an intact SRT (that had been updated and had its consistency maintained during the operation of the guest environment prior to the crash).

The BIOS (Basic Input/Output System) and the first stages of the operating system request pages of disk to load into memory at a guest physical address. For example, the guest operating system will typically mount what is referred to as a root file system (in UNIX, this is "slash," which is a hierarchical file system). After the file system is mounted, all other operations are made relative to the mounted file system.

In some embodiments, the reads (examples of I/O operations) will be made to logical block addresses (e.g., addresses to locations in stable storage), and are monitored for and detected by the hyper-kernel. In some embodiments, the logical block address is a block address in a specific partition on a specific disk (where each disk has a UUID—universal unique identifier, where each disk has a set of partitions, and each partition has a set of logical block addresses). The disk may be on any of the computing nodes in the cluster, or remote from all of the computing nodes.

For example, the guest operating system may make a request to read block 42 from the disk (data from a block address in a certain partition on a certain disk) into a guest physical address. If a copy of the data in block 42 is already present in physical memory (which may be determined by performing a lookup of the SRT, as described above), then completion of the read may simply be satisfied by mapping the guest physical address to the corresponding real physical address that has a copy or clone of the data at block 42 of the disk. That is, when the guest operating system starts, the guest operating system will request data to be read into guest physical addresses. There may be different guest physical addresses utilized from boot session to boot session.

In some embodiments, an I/O read request made by the guest operating system, such as that described above, is captured or trapped by a hyper-kernel on a particular computing node (e.g., a virtual processor will receive the request, where the virtual processor will have been running a host physical processor on a particular computing node). In some embodiments, the hyper-kernel performs a check of its local sub-SRT to see if there is an entry with the logical block address. If so, then this means that a portion of host physical memory on the computing node has a copy of the requested disk data and can be mapped to the guest physical address implicated in the read request.

If there is not an entry in the local sub-SRT of the computing node, various actions may be taken. As one example, a message including the logical block address is broadcast to other nodes in the cluster for determining whether any of the local sub-SRTs on those nodes has an entry that includes the logical block address. If so, in some embodiments, ownership of the guest physical address implicated in the I/O read request is migrated to the node that has an entry in its local SRT that includes the logical block address, and the guest physical address is mapped to the corresponding real physical memory address on that node. The data at the real physical memory address of the other node may also be fetched and brought to the computing node that trapped the I/O read request.

In other embodiments, if there is not a local copy in real physical memory of the requested data at the logical block address, rather than fetching a page of physical memory from another node in the interconnected computing nodes of the cluster, the I/O operation to read from disk is performed (as it may not be faster or more advantageous to do a remote fetch of a page from physical memory on another node, as network operations are being performed either way).

In some embodiments, the hyper-kernel determines whether there is an entry in the SRT corresponding to the disk or stable storage or persistent memory address (e.g., a triple that includes the address on disk). If an entry is present in the SRT, then this means that the disk address is associated with a corresponding real physical memory address that has a copy or clone of the data at that disk address. In this case, rather than performing the I/O read from the disk, the real physical address is simply mapped to the guest physical address, and the read request is thus satisfied without actually having read from the disk. This check is done each time the OS is starting up and performing reads. In this way, the SRT has facilitated speeding up of rebooting (by reducing the number of I/O operations to disk).

If the operating system is asking for a page that is not in the SRT, then the I/O read operation from disk is performed, and an entry in the corresponding sub-SRT is created, as described above (e.g., a triple of logical block address on disk that was read from, real physical memory address that data was read into, and guest physical address to which real physical memory address is mapped is created in the sub-SRT of the computing node to which the real physical memory address belongs). This is performed similarly to any other read from the file system (such as in regular operation of the system, not only at boot time).

In some embodiments, similarly to the implementation of an SRT metadata bit for guest physical addresses that indicates whether the guest physical address is present in the SRT, an SRT metadata bit or other state information may also be maintained for logical block addresses, where such an SRT block bit indicates whether the logical block address is present in the SRT.

In the example of trapping a read request during reboot, as described above, in some embodiments, if the bit indicates that the logical block address is present in the SRT (and thus must be in physical memory as well since there is an entry), then the entry is obtained, and the real physical memory address is mapped to an appropriate guest physical address. In some embodiments, as the existing entry will include a guest physical address that is no longer valid for the triplet, the existing entry is deleted, and a new entry is created that includes the new guest physical address to which the real physical memory address is mapped. In any event, a postcondition is that if a read from a block (e.g., from stable storage or persistent memory or disk) into a guest physical memory address is performed, then the data from the block on disk is also read into a real physical memory address (as there must be a real physical address to back the guest physical memory address). In this way, the postcondition is that the guest physical memory address, real physical memory address, and logical block address are in sync by the end or completion of the disk read request I/O operation.

If the bit indicates that the logical block address is not present in the SRT, then the scanning of the SRT need not be performed, and the read from disk is performed (along with the corresponding creation of a consistent or valid entry in the SRT, as described above).

Purposely Crashing a Computer System

Using the storage replica data structure described herein, fast and efficient reboots are facilitated. In some embodiments, the immediate and relatively low cost restarts facilitated by the use of such storage replica tables can be leveraged in various situations. As one example, suppose that an upgrade to the system is to be performed. In some embodiments, the system may be crashed purposely to perform the upgrade, where the system may be crashed at a relatively low cost because of the ability to restart the system immediately.

As one example, suppose that it is desired to make a change to the computer system for which the guest environment or operating system cannot be running at the same time. This may be to perform an update to the BIOS (e.g., security updates), to update the microcode on a processor, to perform a firmware upgrade to a network interface card (NIC), to perform an upgrade to the guest operating system, etc.

In this example, suppose that an upgrade to the BIOS is to be performed. In the software-defined server described herein, the BIOS is virtual. In one embodiment, in order to upgrade the virtual BIOS, the guest environment or guest virtual machine is caused to crash. The BIOS may then be upgraded, and the guest environment is restarted. With the storage replica data structure described herein, the system may be restarted extremely quickly with the updated BIOS.

The following are examples of initiating a crash of the guest environment or guest virtual machine. In one embodiment, an administrative node is included in the cluster to perform administrative services pertaining to the cluster of physical computing nodes whose resources are aggregated to provide a virtualized environment. For example, the administrative node has access to the local, private networks in the cluster. In some embodiments, resources of the administrative node are not used to host the virtualized resources in the virtual environment. For example, pages of memory and virtual processors are not migrated to/from the administrative node. Rather, the administrative node is used to access the distributed hyper-kernels for various administrative purposes.

During the normal course of operation of the software-defined server, stalls occur which are captured by the hyper-kernel. In some embodiments, in order to cause a crash of the guest virtual machine, rather than executing the operations corresponding to the stall, a value is returned (e.g., return address) such that when the guest operating system returns, it causes the guest operating system to panic, causing the virtual guest environment to crash.

As one example, an end user or operator issues a command to the administrative node (e.g., via a user interface) to perform an operation to upgrade the virtual BIOS of the guest environment with a new version of the BIOS that resides in a file. In response to the request to perform the BIOS upgrade operation, the administrative node (or console running on the administrative node) notifies or otherwise communicates with the hyper-kernels on the computing nodes to perform the panic described above. For example, the administrative node communicates with one of the hyper-kernels running on a computing node, and instructs the hyper-kernel to cause a panic condition. After the crash has been performed, the administrative node may initiate the firmware upgrade of the virtual BIOS. As another example, the hyper-kernel may force a shutdown command in the guest operating system.

The types of commands issued by the administrative node and executed by the hyper-kernel may vary depending on what types of updates are to be performed. For example, in some cases, pre-updates may be allowed to be performed. In some embodiments, the administrative node, in conjunction with the hyper-kernel performs the following: cause a panic and halt, perform the update, and then perform a restart. In some embodiments, the administrative node is configured with the ability to perform a startup of the software-defined server. In other embodiments, the panic is not initiated, and to facilitate an update of the system, a halt is executed, any updates are performed, and then the guest environment is restarted.

Storage Replica Table and Dormant Pages

In some embodiments, dormant pages are created when the guest operating system requests a guest physical memory address that it does not have. If the guest operating system wants to allocate an area of memory at a certain address, in some embodiments, the hyper-kernel creates an entry in the second level page table for that guest physical memory address, but does not actually allocate any real physical memory to back the guest physical address. Instead, the hyper-kernel simply allocates the memory in the second-level page table, and then marks the page as dormant. This is one of several possible states.

In this example, there is an entry in the second level page table, but a real physical page of memory is yet to be allocated for the guest physical memory address. In some embodiments, the allocation of the physical page of memory is only performed when a write occurs into the guest physical memory address. That is, a real physical memory address is allocated in order to perform the write, but not before in some embodiments. If the page were dormant, then a real physical memory page is allocated from a page pool, and the address of the real physical memory page is placed in the second level page table, establishing a mapping or correspondence between the guest physical memory address and the real physical memory address (which is now hosting the guest physical memory). The guest operating system need not know any of these operations being performed by the hyper-kernel. From the perspective of the guest operating system, it simply requests a page of memory, and the operation returns. However, until the write occurs, allocation of a real physical page of memory to underpin a guest physical address need not be performed. In some embodiments, when a read is made from a dormant page, a real physical page of memory is also created/allocated.

Suppose that an I/O read request is being made to write a block of data from disk to a guest physical memory address that is currently marked as dormant (e.g., indicated in the metadata state information stored for the guest physical memory address). There will need to be a page of real physical memory that the guest physical address can be mapped to that has a copy of the data being read from disk. If there is no entry in the SRT for the logical block address, then a page of real physical memory is allocated for the guest physical address, the I/O read request is performed, and the data at the logical block address is copied to the allocated page of real physical memory, which is mapped to the guest physical memory address. As the stable storage has been accessed, a corresponding SRT entry is created as well.

However, if there is already an entry in the SRT for the logical block address, then this indicates that there is a corresponding page of real physical memory that has a copy of the data at the logical block address on disk. In this case, the guest physical address specified by the guest is mapped to that page of real physical memory at the real physical address specified in the SRT entry. As part of the mapping, the dormancy status of the guest physical address (which may be stored in state information for the guest physical address, as described above) is changed to indicate that the guest physical address is no longer dormant. In this way, there is not an entry in the SRT with a guest physical address that is dormant.

In the case of bootup, where the guest will request data from disk, the SRT may be used to determine whether copies of data from logical block addresses are already present in real physical memory in the cluster. If so, then those real physical memory addresses may be mapped to guest physical addresses specified by the guest (e.g., the target of the I/O operation).

In some embodiments, when the boot starts, the hyper-kernel wipes out or clears out the guest physical memory addresses in the triples of the SRT (as those are likely to be updated).

Figure 17:
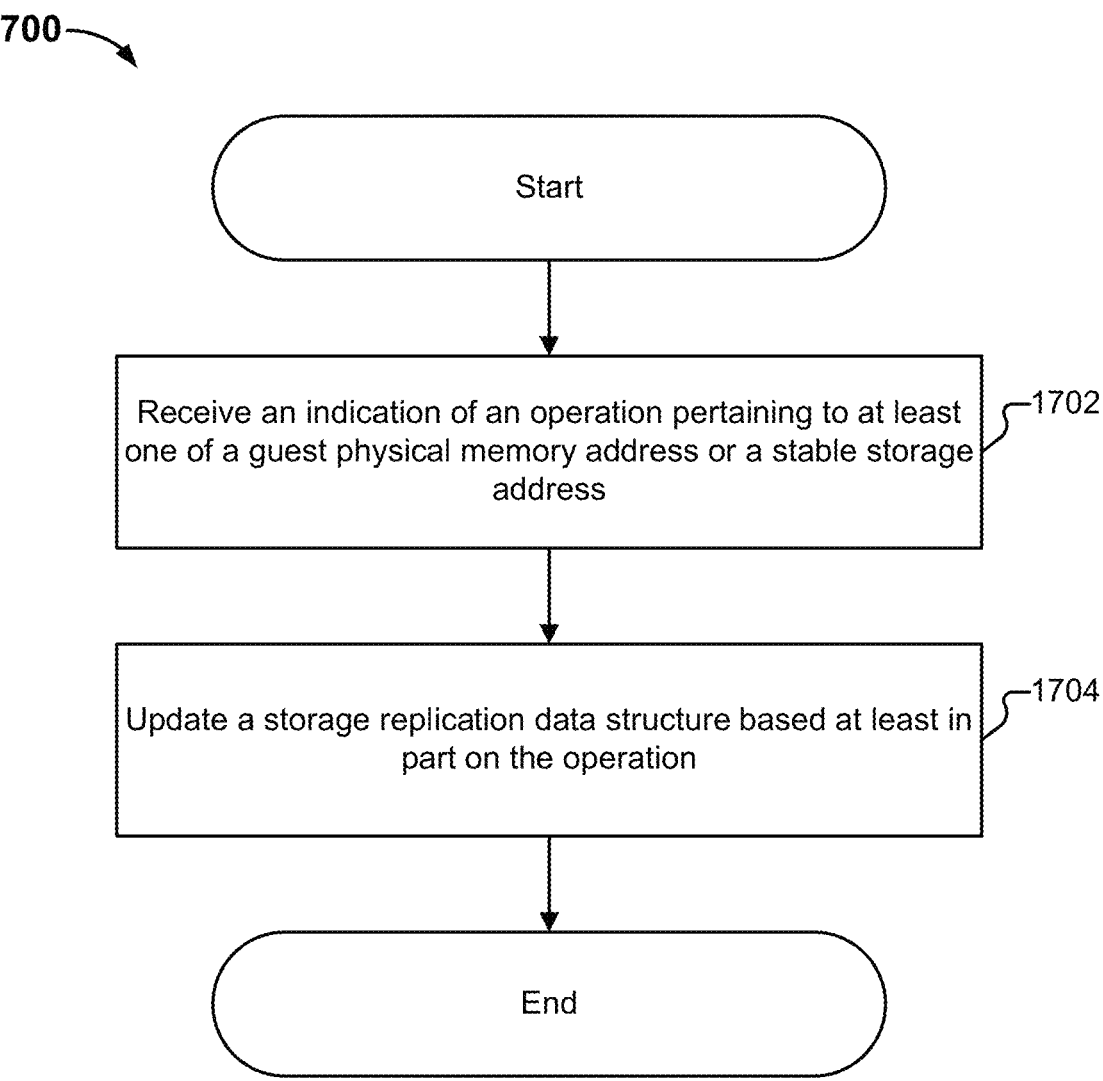
FIG. 17 is a flow diagram illustrating an embodiment of a process for utilizing a storage replica data structure.

FIG. 17 is a flow diagram illustrating an embodiment of a process for utilizing a storage replica data structure. In various embodiments, this includes maintaining consistency of the storage replica data structure, as well as using the storage replica data structure during reboot. In some embodiments, process 1700 is executed by a hyper-kernel. The process begins at 1702 when an indication of an operation pertaining to at least one of a guest physical memory address or a stable storage address is received.

At 1704, a storage replica data structure is updated based at least in part on the operation. In some embodiments, the storage replica data structure includes a set of entries. The set of entries in the storage replica data structure includes associations among guest physical memory addresses, physical memory addresses, and stable storage addresses In some embodiments, if it is determined that there is an entry in the storage replica data structure corresponding to the guest physical memory address, then the existing SRT entry is removed from the storage replica data structure. This is because the page of guest/backing host physical memory was previously also representative of data on the disk (e.g., had a clone of disk data). However, this will no longer be the case (as it is not necessarily the case that the updated contents of the page of guest/host physical memory will be written to disk, let alone written to the same location on disk).

If it is determined that an I/O operation is being performed with respect to the portion of guest physical memory, then a new entry is created that includes a triple of the portion of guest physical memory, a corresponding portion of host physical memory (indicated by its host physical memory address), and a corresponding location on storage such as disk (or a location on stable storage or persistent memory or other type of storage).

In some embodiments, invariance is maintained using the techniques described herein in response to an I/O operation such as an I/O read. For example, when an I/O read from disk is requested, the hyper-kernel determines whether there is an entry in the SRT. If there is no entry in the SRT, then one is created by the end or completion of the operation. If there is an entry in the SRT, then by the end of the operation, the entry is ensured to be consistent (e.g., by wiping the existing triplet and creating a new one, replacing an existing element of the triplet so that the triplet is consistent, etc.). In some embodiments, the postcondition is that the triple in the SRT is consistent. That is, by the end of the operation, before returning to the guest operating system, the entry is required to be consistent in various embodiments. If the entry was not there, then it is created. If there is an existing entry, then it is updated. In all cases, the entry should be consistent by the end of the operation, regardless of whether a read or a write.

In various embodiments, there are various operations or transactions for which the hyper-kernel updates or causes changes in the storage replica table (or sub-portions of the SRT on implicated nodes). In various embodiments, such operations include:

New writes to guest physical address pages that correspond to locations on disk (logical block addresses or stable storage addresses or addresses to portions of persistent memory). If this is the case, the existing entry for that guest physical address is cleared or wiped out.

I/O operations in which the disk is updated (e.g., a logical block address of the disk is written to). This will change any existing correspondence between the logical block address and guest physical memory (and by extension, the host physical memory backing the guest physical memory). Or this may result in a new correspondence between the guest physical memory and the disk, where a new entry is created in a sub-SRT to include the correspondence between the guest physical address and the logical block address, along with the real physical memory address on the computing node backing the guest physical address (where the sub-SRT that is updated is the one on the node with the real physical memory backing the guest physical address—that is, in some embodiments, the sub-SRT that is updated is the one on the node that has current ownership of the guest physical memory address).

In some embodiments, reads from disk or stable storage also trigger the creation of entries in SRTs. For example, when data is read from a logical block address on disk, it is read into a page of real physical memory. That page of real physical memory is mapped to a guest physical memory address. Thus, there is now a correspondence between a guest physical memory address, a real physical memory address, and a logical block address or stable storage address. In some embodiments, an entry is created in the SRT that includes a triple that has the above three elements (e.g., created in the sub-SRT for the node that has the real physical address).

Page migration—In some embodiments, updates to the SRT (or to local sub-SRTs) are made in response to page migration, as this will change the mapping between a guest physical memory address and host physical memory addresses.

Removal/Addition of computing nodes in a software-defined server cluster—In some embodiments, updates to the SRT (or to local sub-SRTs) are made in response to addition and/or removal of computing nodes, as this will change the mapping between guest physical memory addresses and host physical memory addresses.

Described herein are embodiments of techniques whereby an SDS can be restarted very quickly after a fatal software error in the guest virtual machine by using a clone of guest physical memory contained in stable storage. The fast SDS restart techniques may be implemented in inexpensive commodity persistent memory technology. The implementation requires no changes to the guest operating system, any database, or any application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A distributed system comprising:
a plurality of computing nodes comprising:
    a first memory; and
    hardware processors providing a virtual environment hosted by the plurality of computing nodes, wherein a guest operating system runs on the virtual environment, and at least one hardware processor of the processors:
        stores clone identifying information in a storage replica data structure identifying clones of content of stable storage stored in the first memory;
        receives a request from the guest operating system for an operation directed to at least one of a first address of a second memory or a second address of the stable storage corresponding to the first address; and
        updates the storage replica data structure to correspond to a change to the clone identifying information due to the operation.

2. The distributed system of claim 1, wherein the operation comprises a write operation directed to writing data to the first address.

3. The distributed system of claim 2, wherein the at least one hardware processor:
responsive to the request, determines whether the storage replica table contains an entry corresponding to the first address.

4. The distributed system of claim 3, wherein the at least one hardware processor:
responsive to determining that the storage replica table contains the entry, removes the entry from the storage replica table.

5. The distributed system of claim 2, wherein the at least one hardware processor determines whether the storage replica table contains the entry based on state information associated with the first address.

6. The distributed system of claim 1, wherein the operation comprises a write operation directed to writing data to the second address.

7. The distributed system of claim 6, wherein the at least one hardware processor, responsive to the write operation:
maps the first address to a third address of the first memory; and
writes data stored at the third address to the second address.

8. The distributed system of claim 7, wherein the at least one hardware processor, responsive to the write operation, creates an entry in the storage replica table associating the first address, the second address and the third address.

9. The distributed system of claim 1, wherein the operation comprises a read operation directed to reading data stored at the second address and storing the data at the first address.

10. The distributed system of claim 9, wherein the at least one hardware processor:
responsive to the read operation, identifies a first entry of the storage replica table associating the second address with a third address of the first memory containing a copy of the data stored at the second address.

11. The distributed system of claim 10, wherein the at least one hardware processor, responsive to the identification:
maps the first address to the third address; and
adds a second entry to the storage replica table associating the first address, the second address and the third address.

12. The distributed system of claim 9, wherein the at least one hardware processor receives the request during a reboot of the virtual environment.

13. The distributed system of claim 1, wherein:

the operation comprises a write operation directed to writing data to the second address; and the at least one hardware processor:

responsive to the request, determines whether the storage replica table contains an entry corresponding to the second address; and responsive to determining that the storage replica table contains the entry, removes the entry from the storage replica table.

14. The distributed system of claim 1, wherein:

the storage replica table comprises an entry associating a third address of the first memory with the first address and the second address; and the at least one hardware processor, responsive to data stored at the third address being migrated to a fourth address of the first memory, updates the entry to replace the third address with the fourth address.

15. The distributed system of claim 1, wherein:

the storage replica table comprises an entry associating a third address of the first memory with the first address and the second address;

the third address corresponds to memory of a first computing node of the plurality of computing nodes;

the at least one hardware processor, responsive to the first computing node being removed from the plurality of computing nodes, updates the entry to replace the third address with a fourth address of the first memory corresponding to a second computing node of the plurality of computing nodes.

16. The distributed system of claim 1, wherein the storage replica table is distributed across the plurality of computing nodes.

17. A method comprising:

providing a virtual environment hosted by a plurality of computing nodes, wherein a guest operating system runs on the virtual environment;

providing, by each computing node of the plurality of computing nodes, a hyper-kernel;

storing, by the hyper-kernels, clone identifying information in a storage replica data structure identifying clones of content of stable storage stored in a real physical memory of the plurality of computing nodes;

receiving, by a first hyper-kernel of the hyper-kernels, a request from the guest operating system for an operation directed to at least one of a first address of a guest physical memory or a second address of the stable storage corresponding to the first address; and responsive to the request, updating, by the first hyper-kernel, the storage replica table to correspond to a change to the clone identifying information due to the operation.

18. The method of claim 17, wherein the request is associated with a reboot of the virtual environment, the request comprises a request to read data stored at the second address and store the data at the first address, and the method further comprises, responsive to the request:

mapping, by the first hyper-kernel, the first address to a third address of the real physical memory;

identifying, by the first hyper-kernel, a first entry of the storage replica table associating the second address with a fourth address of the real physical memory;

reading, by the first hyper-kernel, content from the fourth address and storing the content at the first address; and creating, by the first hyper-kernel, a second entry of the storage replica table associating the first address, the second address and the third address.

19. A non-transitory storage medium storing machine-readable instructions that, when executed by a machine, cause the machine to:

store clone identifying information in a storage replica data structure of a distributed system identifying clones of content of stable storage stored in a real physical memory of the distributed system;

receive, from a guest operating system, a request for an operation directed to at least one of a first address of a guest physical memory of the distributed system or a second address of the stable storage corresponding to the first address, wherein the guest operating system runs on a virtual environment hosted by computing nodes of the distributed system; and update the storage replica data structure to correspond to a change to the clone identifying information due to the operation.

20. The storage medium of claim 19, wherein the request is associated with a reboot of the virtual environment, the request comprises a request to read data stored at the second address and store the data at the first address, and the instructions, when executed by the machine, further cause the machine to, responsive to the request:

map the first address to a third address of the real physical memory;

identify a first entry of the storage replica table associating the second address with a fourth address of the real physical memory;

read content from the fourth address and store the content at the first address; and create a second entry of the storage replica table associating the first address, the second address and the third address.

* * * * *